United States Patent [19]
Morishige et al.

[11] Patent Number: 5,089,964
[45] Date of Patent: Feb. 18, 1992

[54] HYDRAULIC TRANSMISSION CONTROL SYSTEM

[75] Inventors: Chitoshi Morishige; Tomoo Sawasaki, both of Hiroshima, Japan

[73] Assignee: Mazda Motor Corporation, Hiroshima, Japan

[21] Appl. No.: 466,231

[22] Filed: Jan. 19, 1990

[30] Foreign Application Priority Data

Jan. 19, 1989 [JP] Japan ................................. 1-10430

[51] Int. Cl.$^5$ .......................................... B60K 41/12
[52] U.S. Cl. ................................. 364/424.1; 74/866
[58] Field of Search .............. 364/424.1; 74/866, 867, 74/868

[56] References Cited

U.S. PATENT DOCUMENTS

| | | | |
|---|---|---|---|
| 4,718,306 | 1/1988 | Shigematsu et al. | 74/866 |
| 4,778,435 | 10/1988 | Sugaya et al. | 74/868 |
| 4,790,214 | 12/1988 | Hattori et al. | 74/866 |
| 4,796,489 | 1/1989 | Nagamatsu et al. | 74/866 |
| 4,841,814 | 6/1989 | Satoh | 74/866 |
| 4,858,497 | 8/1989 | Kouno | 364/424.1 |
| 4,916,982 | 4/1990 | Suzuki | 74/866 |

Primary Examiner—Salvatore Cangialosi
Attorney, Agent, or Firm—Fleit, Jacobson, Cohn, Price, Holman & Stern

[57] ABSTRACT

A hydraulic control system for a steplessly variable transmission, having primary and secondary pulley assemblies, controls a line pressure for complementarily varying effective diameters of the primary and secondary pulley assemblies so as to steplessly vary a transmission ratio of the steplessly variable transmission. The line pressure is changed according to an engine output transmitted to the primary pulley assembly from an engine and a transmission ratio of the steplessly variable transmission. A decrease of pressure is caused in the line pressure according to a thrust exerted on either one of the primary and secondary pulley assemblies caused by centrifugal force.

9 Claims, 15 Drawing Sheets $P_S$
$A_P$
$N_P$
33

35

$P_S$
$A_S$
$N_S$
34

HYDRAULIC TRANSMISSION CONTROL SYSTEM

BACKGROUND OF THE INVENTION

1. Field of the Invention

The present invention relates to a hydraulic control system for a steplessly variable transmission used on an automotive vehicle, and more particularly, to a hydraulic control system for varying effective diameters of pulleys driven by an endless belt so as to vary the ratio of transmission of a steplessly variable transmission used on an automotive vehicle.

2. Description of related Art

One known type of automatic transmission is a steplessly variable transmission having a belt-pulley transmission mechanism which consists of a pair of, or primary and secondary, pulleys variable in effective diameter or pitch and an endless belt rotationaly coupling the primary and secondary pulleys together. The primary pulley is connected directly, or indirectly, to an engine output and the secondary pulley is connected to a drive line of the automotive vehicle. The primary and secondary pulleys are controlled by means of a hydraulic control system to be complementarily changed in effective diameter, thereby steplessly varying the ratio of transmission of the belt-pulley transmission mechanism. Such a hydraulic control system for steplessly variable transmissions is known from, for example, Japanese Unexamined Patent Publication No. 58(1983)-88252.

The hydraulic control system described in the above publication has as an object to help lengthen the lifetime of the endless belt and improve the engine output transmission efficiency of the steplessly variable transmission. Such is accomplished by regulating the pressure of oil for controlling the effective diameters of the pulleys according to the reduction ratio of the belt-pulley transmission mechanism and an engine torque drawn from engine output curves memorized in a microcomputer, based on an engine operating condition. In a steplessly variable transmission, it is essential, in contrast with conventional automatic transmissions, to regulate accurately the pressure of pulley control oil with a high accuracy in order to prolong the lifetime of the endless pulley and improve highly the engine output transmission efficiency of the transmission. A decreased accuracy in regulating the pressure of pulley controlling oil causes some slippage between the endless belt and secondary pulley. This leads to an engine torque transmission loss in the steplessly variable transmission and a decreased durability of the endless belt.

One of various factors due to which the accuracy of regulating the pressure of pulley controlling oil would deteriorate, as pointed out in, for example, Japanese Unexamined Patent Publication No. 60(1985)-49158, is fluctuations in the pressure of oil in cylinders of the pulleys, caused due to centrifugal forces developed by the rotating pulleys. The pulleys, when rotating, develop such centrifugal forces and thereby cause a decrease in their effective diameters. One approach to compensating the changes of effective diameter of the pulleys, due to centrifugal forces caused in the pulleys, described in the above noted publication is to drop the pressure of pulley controlling oil according to the centrifugal force calculated, based on the speed of rotation of the secondary pulley.

Dropping the pressure of pulley controlling oil according to the centrifugal force, on one hand, causes an increase in oil pump efficiency, which contributes to reducing engine load and takes advantage of fuel economy and, on the other hand, allows the endless belt to produce some slippage, which results in an inaccurate change of the transmission ratio of the steplessly variable transmission. It is apparent that, as a speed at which the automobile vehicle runs becomes higher, the endless belt allows more slippage.

SUMMARY OF THE INVENTION

It is therefore, a primary object of the present invention to provide a hydraulic control system for a steplessly variable transmission of an automobile vehicle in which a line pressure is changed to surely cause a desired transmission ratio change of the steplessly variable transmission.

The objects of the present invention are achieved by a hydraulically control system for a hydraulic controlled steplessly variable transmission of an automotive vehicle having primary and secondary pulley assemblies, which are complementarily variable in effective diameter to steplessly vary a transmission ratio of the hydraulic controlled steplessly variable transmission and operationally coupled by a belt. The hydraulic control system controls a basic line pressure by which the primary and secondary pulley assemblies are caused to vary their effective diameter for the variation of transmission ratio. The basic line pressure is regulated to a proper pressure according to an engine output and a desired transmission ratio.

According to the present invention, the hydraulic control system comprises pressure control means for causing a decrease of pressure in the basic line pressure according to a thrust exerted on either one of the primary and secondary pulley assemblies caused by centrifugal force thereof, calculating means for calculating a minimum necessary line pressure according to the centrifugal force of the one of the primary and secondary pulley assemblies and a ratio of thrusts of the primary and secondary pulley assemblies at least necessary to vary a transmission ratio of the hydraulic controlled steplessly variable transmission and means for disabling an operation of the pressure control means and developing a line pressure up to the minimum necessary line pressure when a difference in the basic line pressure from the thrust exerted on the one of the primary and secondary pulley assemblies caused by centrifugal force thereof is lower than the minimum necessary line pressure

BRIEF DESCRIPTION OF THE DRAWINGS

The above and other objects and features of the present invention will become apparent to those skilled in the art from the following detailed description of the preferred embodiments when taken in conjunction with the accompanying drawings, in which.

DESCRIPTION OF THE PREFERRED EMBODIMENT

Parts which do not form part of, or cooperate directly with, the invention, and parts which are purely of conventional construction will not be described in detail. It is to be understood that parts not specifically shown or described can take various forms well known to those skilled in the automotive vehicle transmission art.

Figure 1:
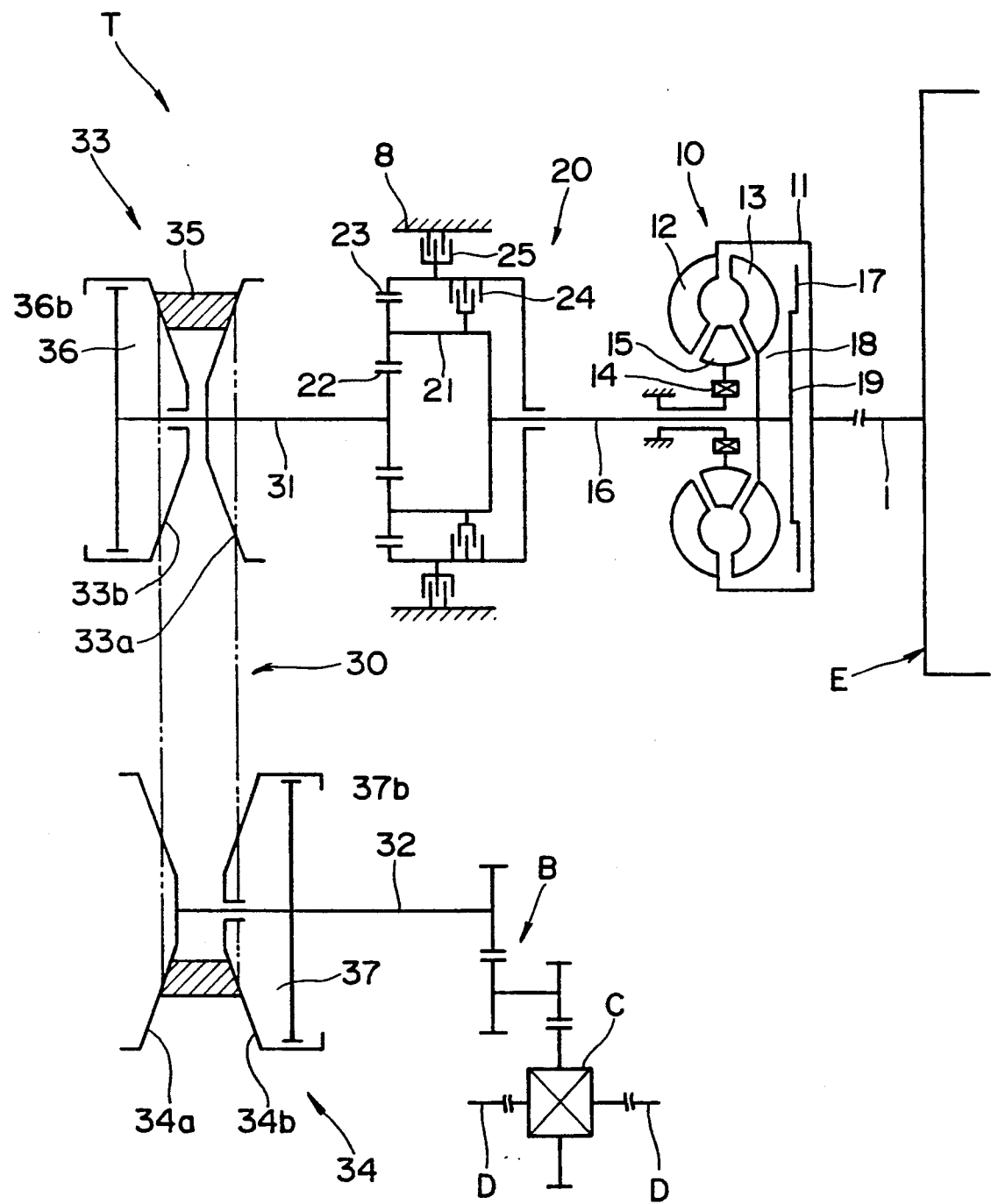
FIG. 1 is a schematic illustration of a steplessly variable transmission in cooperation with a hydraulic control system in accordance with a desired embodiment of the present invention.
Figure 2:
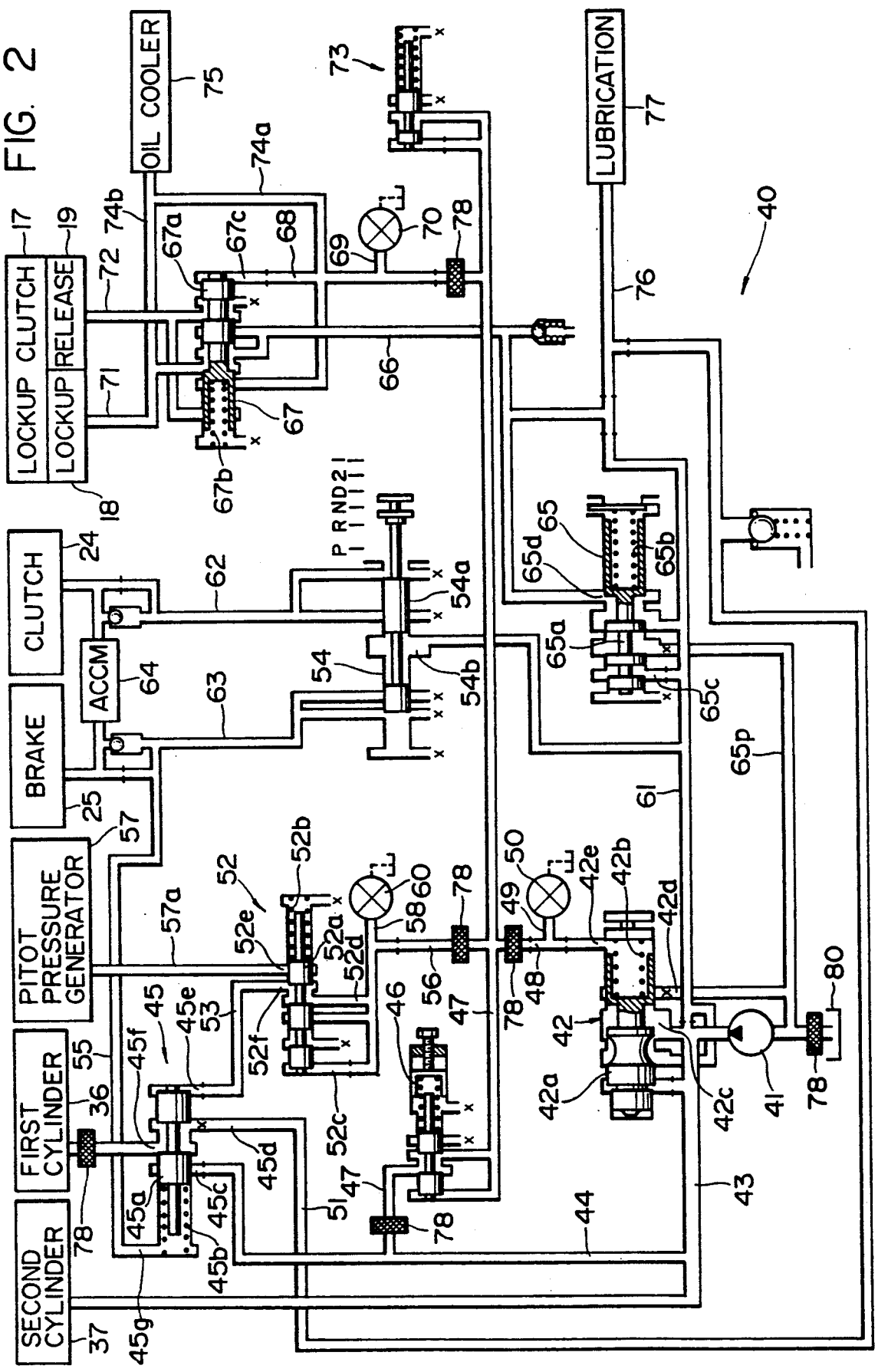
FIG. 2 is a diagrammatical illustration of a hydraulic control system for controlling a line pressure for the steplessly variable transmission shown in FIG. 1.
Figure 3:
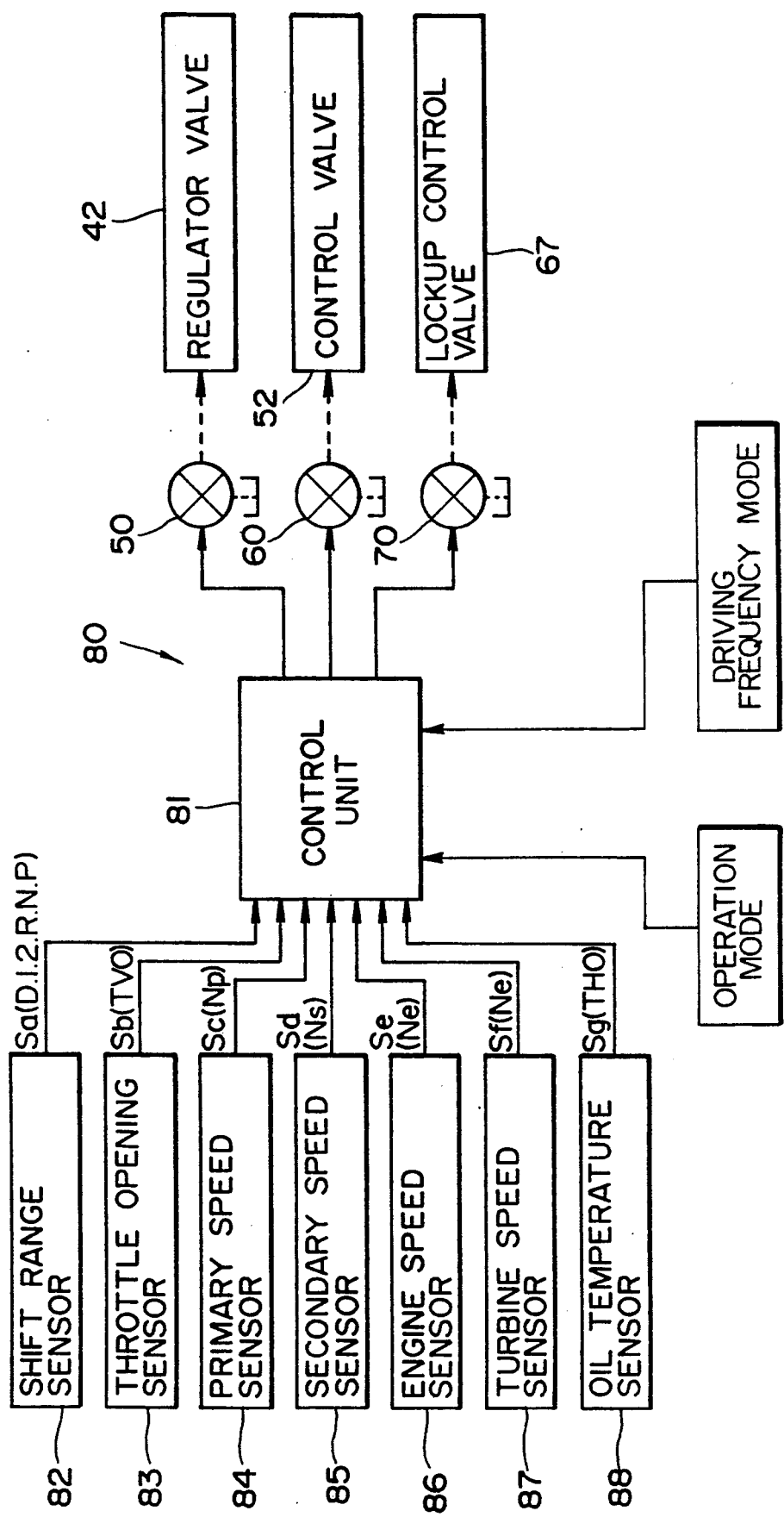
FIG. 3 is a block diagram showing a circuit system for controlling duty solenoids of the hydraulic control system shown in FIG. 2.

Referring to the drawings in detail, particularly to FIGS. 1 to 3, a steplessly variable transmission T having a hydraulic control system in accordance with a preferred embodiment of the present invention is shown. The transmission comprises a fluid coupling or torque converter 10, connected to an output shaft 1 of an engine E, such as an engine crank shaft, for transmitting engine output either with or without slippage, a forward/reverse shift unit 20 disposed on the output side of of the torque converter 10, and a belt-pulley transmission unit 30 changeably transmitting the engine output transmitted from the torque converter 10 to axles D by means of a reduction gear unit B and a differential unit C.

Torque converter 10, which can multiply engine torque, comprises a pair of torus members, a driving torus or pump 12 and a driven torus or turbine 13, placed face to face with a slight clearance therebetween. The driving torus or pump 12 is connected or fastened to the engine output shaft 1 and the driven torus or turbine 13 is connected or fastened to an output or turbine shaft 16. A thin housing 11 of the torque converter 10 surrounds the turbine 13 and firmly holds the pump 12. A stator 15, which practically multiplies engine torque, is connected to a transmission housing 8 of the steplessly variable transmission 1 through the one-way clutch 14 and stator shaft between the pump 12 and turbine 13. To produce stator locking action, the one-way clutch 14 is secured to the transmission housing 8 of the steplessly variable transmission 1. As is well known, the torque converter housing 11 is filled with a special lightweight oil to transmit engine output from the pump 12 to the turbine 13. The torque converter 10 is further provided with a lockup clutch 17 slidably connected to the turbine shaft 16 for either mechanically locking the pump 12 and turbine 13 together or unlocking them, thereby either preventing or allowing slipping action of the torque converter 10. When transmission fluid flows into a space 19, hereinafter referred to as a release or unlock pressure chamber, there is no contact between the torque converter housing 11 and a friction surface of the clutch piston of the lockup clutch 17. The pump 12 and the turbine 13 are accordingly free from each other and drive is provided through the fluid. On the other hand, when transmission fluid flows into a space 18, hereinafter referred to as a lockup pressure chamber, between the turbine 13 and the lockup clutch 17, lockup conditions are present. The lockup clutch 17 moves, engaging the friction surface of the clutch piston of the lockup clutch 17 with the torque converter housing 11 to lock up or directly couple the pump 12 and the turbine 13 together.

It should be noted herein that there are two different types of torque transmitted from the engine output shaft 1 to the forward/reverse shift unit 20 through the torque converter 10; a torque transmitted through the turbine 13 (which is referred to as a converter transmitting torque) and a torque transmitted through the lockup clutch 17 (which is referred to as a lockup clutch transmitting torque). Accordingly, as will be described in detail, a torque that is transmitted to an input shaft 31 of the belt-pulley transmission unit 30 connected to a primary pulley assembly 33 should be determined, taking into account these two types of torque.

Forward/reverse shift unit 20 mainly consists of a compact planetary gearset that is disposed between the torque converter 10 and the belt-pulley transmission unit 30. A pinion carrier 21 of the planetary gearset is connected to the turbine shaft 16 of the torque converter 10 and a sun gear 22 of the planetary gearset is connected to the input shaft 31 of the belt-pulley transmission unit 30. The forward/reverse shift unit 20 is provided with a clutch 24 disposed between the pinion gear 21 and a ring gear 23 of the planetary gearset. A brake 25 is interposed between the ring gear 23 of the planetary gearset and the casing of the steplessly variable transmission 1. Because of the clutch 24 and brake 25 thus incorporated in the planetary gearset, the engine output transmitted from the output shaft 1 of the engine E, and then the torque converter 10, is connected to or cut off from the belt-pulley transmission unit 30. That is, the rotation of the engine E transmitted from the output shaft 1 and the torque converter 10 is either connected to the input shaft 31 of the belt-pulley transmission unit 30 when the clutch 24 is locked but the brake 25 is released or reversed and connected to the same when the clutch 24 is unlocked but the brake 25 is locked.

Belt-pulley transmission unit 30 further has an output shaft 32 laterally spaced from and disposed in parallel with the input shaft 31 thereof. Associated with the input and output shafts 31 and 32, respectively, are a driving or primary pulley assembly 33 and a driven or secondary pulley assembly 34 rotationally coupled together by an endless V-belt 35. The primary pulley assembly 33 comprises a stationary pulley flange or conical disc 33a and a movable pulley flange or conical disc 33b arranged coaxially in face-to-face fashion, each having a generally frustoconical configuration. The stationary pulley flange 33a is fastened to the input shaft 31; the movable pulley flange 33b is slidably mounted on the input shaft 31 to move axially closer to or away from the stationary pulley flange 33a so as thereby to decreasingly or increasingly vary the distance between the stationary and movable pulley flanges 33a and 33b. As the distance between the stationary and movable pulley flanges 33a and 33b changes, the primary pulley assembly 33 changes in effective diameter.

Secondary pulley assembly 34 is substantially the same in structure and operation as the primary pulley assembly 33 and comprises a stationary pulley flange or conical flange 34a fastened to the output shaft 32 and a movable pulley flange or conical flange 34b slidably mounted on the output shaft 32 to move axially closer to or away from the stationary pulley flange 34a so as thereby to decreasingly or increasingly vary the distance between the stationary and movable pulley flanges 34a and 34b and, accordingly, the effective diameter of the secondary pulley assembly 34. For causing the movable pulley flanges 33b and 34b to move axially, complementarily in opposite directions there are provided first and second hydraulic cylinders 36 and 37 cooperating with the movable pulley flanges 33b and 34b of the primary and secondary pulley assemblies 33 and 34, respectively. The first and second hydraulic cylinders 36 and 37 are operationally correlated and actuated simultaneously in such a way as to move the movable pulley flanges 33b and 34b so as to inversely vary the effective diameter of the primary and secondary pulley assemblies 33 and 34. In more detail, if the first hydraulic cylinder 36 is filled with fluid to thereby displace the movable pulley flange 33b axially toward the stationary pulley flange 33a, the effective diameter of the primary pulley assembly 33 is increasingly varied. Upon this displacement of the first hydraulic cylinder 36, fluid is discharged from the second hydraulic cylinder 37 so as to displace the movable pulley flange 34b axially away from the stationary pulley flange 34a, decreasingly varying the effective diameter of the secondary pulley assembly 34 complementarily to the increase of effective diameter of the primary pulley assembly 33. In this way, the belt-pulley transmission unit 30 increasingly or decreasingly changes itself in transmission ratio. It is to be noted that line pressure supplied to the second hydraulic cylinder 37 is controlled according to the engine output and the transmission ratio of the belt-pulley transmission unit 30., therefore, the endless V-belt 35 is in tension and the belt-pulley transmission unit 30 transmits a necessary torque.

The lockup clutch 17 of the torque converter 10, the clutch 24 of the forward/reverse shift unit 20 and the first and second pistons 36b and 37b of the hydraulic cylinders 36 and 37 of the belt-pulley transmission unit 30 are all actuated and controlled by respectively associated actuators, such as hydraulic valves, having actions which are controlled by a control system consisting of a hydraulic control circuit 40, shown in detail in FIG. 2. As shown, the hydraulic control circuit 40 includes a hydraulic or oil pump 41 operated by the engine E of the automotive vehicle in a well known manner. The hydraulic pump 41 pumps and delivers fluid or oil into the hydraulic control circuit 40. The oil spouting from the hydraulic pump 41 flows first into a regulator valve 42 and is regulated thereby so as to develop a certain line pressure in a main pressure line 43. The line pressure thus regulated is delivered into the second hydraulic cylinder 37 of the secondary pulley assembly 34 through the main pressure line 43. The main pressure line 43 branches off into a control pressure line 44 to connect the line pressure in the main pressure line 43 to the first hydraulic cylinder 36 of the belt-pulley transmission unit 30 through a control valve 45 for transmission ratio control.

Regulator valve 42 has a spool 42a and a return spring 42b for urging or forcing the spool 42a in a direction of the axis of the spool 42a towards the left as viewed in FIG. 2. The regulator valve 42 is formed with an inlet port 42c and a drain port 42d axially displaced from the inlet port 42c at the middle thereof. The control pressure line 44 branches off into a reduced pressure line 47 with a pressure reducing valve 46 disposed therein which is connected to an inlet port 42e of the regulator valve 42 for a pilot pressure by way of a pilot pressure line 48. The spool 42a of the regulator valve 42 receives the line pressure in the main pressure line 43 at one end thereof and a pilot pressure in the pilot pressure line 48 at the other end thereof opposite to the one end.

The pressure reducing valve 46 reduces control pressure from the control pressure line 44. The pilot pressure line 48 branches off into a drain line 49, which is relatively short in length, the drain line 49 being provided with a first duty solenoid 50 having a structure which will be described in detail later. The first duty solenoid 50 periodically operates to open at a duty rate so as to regulate a pilot pressure in the pilot pressure line 48 to be delivered to the regulator valve 42 according to the duty rate. Pilot pressure is exerted on the spool 42a of the regulator valve 42 and forces it to be displaced in the same direction as it is forced by the return spring 42b. The spool 42a of the regulator valve 42 is displaced in either direction according to the difference between line pressure and pilot pressure exerted on both ends of the spool 42a of the regulator valve 42 in opposite directions, whereby the pressure inlet port 42c of the regulator valve 42 is connected to or disconnected from the drain port 42d so as to regulate the line pressure in the main pressure line 43 depending upon pilot pressure in the pilot pressure line 48. Thus, the line pressure in the main pressure line 43 is regulated corresponding to the duty rate at which the first duty solenoid 50 is operated.

Transmission ratio control valve 45, which is disposed in the control pressure line 44 for actuating the piston 36b of the first hydraulic cylinder 36 for the primary pulley assembly 33 so as to vary the transmission ratio of the belt-pulley transmission unit 30, has a spool 45a and a return spring 45b for urging or forcing the spool 45a in a direction of the axis of the spool 45a towards the right as viewed in FIG. 2. The transmission ratio control valve 45 is formed at the middle with an inlet port 45c for a control pressure and a drain port 45d axially displaced from each other. The control pressure inlet port 45c is connected to the control pressure line 44; the drain port 45d is connected to a drain line 51. As the spool 45a is displaced in either direction according to the difference between pressures exerted on the both ends thereof, either the control pressure inlet port 45c or the drain port 45d is selectively communicated with a control pressure outlet port 45f connected to the first hydraulic cylinder 36 for the primary pulley assembly 33 by way of the control pressure line.

To move the spool 45a against the return spring 45b, the transmission ratio control valve 45 is further provided with a pilot pressure inlet port 45e formed at one end thereof to which a pilot pressure changing valve 52 is connected by way of a pilot pressure line 53 and a pressure reversing port 45g formed at the other end thereof to which a manually operated shift valve 54 is connected by way of a reversed pressure line 55.

Pilot pressure changing valve 52 has a spool 52a and a return spring 52b for urging or forcing the spool 52a in a direction of the axis of the spool 52a towards the left as viewed in FIG. 2. The pilot pressure changing valve 52 is formed with an inlet port 52c for a pilot pressure at one end, first and second pilot pressure inlet ports 52d and 52e axially displaced from each other at the middle, and a pilot pressure outlet port 52f at the other end. The pressure inlet port 52c and the first pilot pressure inlet port 52d are communicated with each other by way of a pilot pressure line 56 into which the reduced pressure line 47 branches off. The second pilot pressure inlet port 52e is connected to a Pitot pressure generator 57 generating a Pitot pressure corresponding to the speed of the engine E by way of a Pitot pressure line 57a. The pilot pressure outlet port 52f is connected to the pilot pressure inlet port 45e of the transmission ratio control valve 45 by way of the pilot pressure line 53. The pilot pressure line 56 has a drain line extension 58 provided with a second duty solenoid 60 which is the same in structure and operation as the first duty solenoid 50. The second duty solenoid 60 operates periodically to open at a certain duty rate so as thereby to regulate pilot pressure conducted into the pilot pressure changing valve 52 according to the duty rate.

Figure 4:
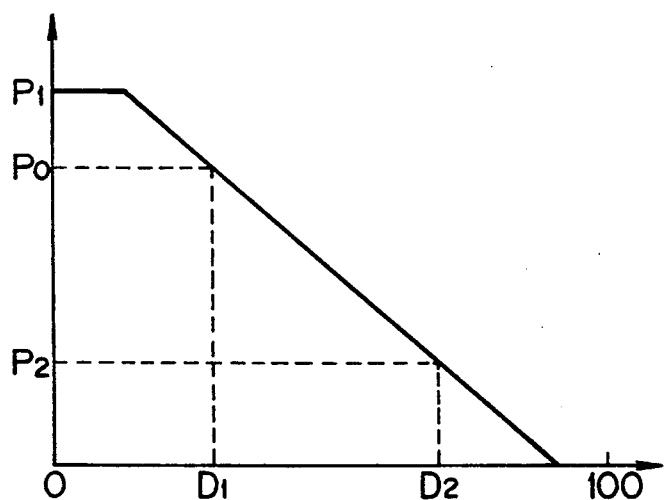
FIG. 4 is a map used to determine a duty rate.

The second duty solenoid 60 operates at a duty rate between zero (0) to 100% to develop pilot pressure ranging from zero to a predetermined pressure P1 in the pilot pressure line 56 as shown in FIG. 4. That is, when the duty rate of the second duty solenoid 60 is between D1 and D2 or when a pilot pressure in the pilot pressure line 56 is between $P_o$ and $P_2$, the spool 52a of the pilot pressure changing valve 52 is axially displaced to the left so as to communicate the first pilot pressure inlet port 52d and the pilot pressure outlet port 52f, while shutting off the second pilot pressure inlet port 52e. On the other hand, when the duty rate of the second duty solenoid 60 is between zero (0) and D1 or when the pilot pressure in the pilot pressure line 56 is between $P_1$ and $P_0$, the spool 52a is axially displaced all the way to the right against the return spring 52b so as to communicate the second pilot pressure inlet port 52e and the pilot pressure outlet port 52f, while shutting off the first pilot pressure inlet port 52d. In this way, the pilot pressure changing valve 52 selectively communicates either the first pilot pressure inlet port 52d or the second pilot pressure inlet port 52e with the pilot pressure outlet port 52f according to the duty rate of the second duty solenoid 60, and hence changes or controls the pilot pressure in the pilot pressure line 56.

To control a transmission ratio by the second duty solenoid 60, a target or desired transmission ratio is first determined according to the deviation of the actual speed of rotation of the primary pulley speed from a target primary pulley speed corresponding to operating conditions. The target primary speed of the primary pulley assembly 33 is determined from a target primary speed map drawn up for each shift range of the steplessly variable transmission T by using two parameters, vehicle speed (or secondary pulley speed) and throttle opening. The duty rate at which the second duty solenoid 60 is operated is feedback controlled in a manner described in detail later so as to vary the pilot pressure in the pilot pressure line 53 to be delivered to the transmission ratio changing valve 45 and, therefore, to vary the control pressure delivered to the first hydraulic cylinder 36 of the primary pulley assembly 33 so that the belt-pulley transmission assembly 30 reaches the desired speed ratio.

If the second duty solenoid 60 accidentally becomes inoperative, or does not open or close, due to failures, such as burn-out, the greatest pilot pressure is induced into the pilot pressure changing valve 52 through the pressure inlet port 52c and acts on the spool 52 to shift it to the right (as viewed in FIG. 2) against the return spring 52b, so as to communicate the Pitot pressure inlet port 52e and the pilot pressure outlet port 52f of the pilot pressure changing valve 52 with each other, thereby allowing a Pitot pressure generated by the Pitot pressure generator 57 in accordance with the speed of the engine E to pass through the pilot pressure changing valve 52 and act on the spool 45a of the transmission ratio control valve 45 so as to shift it to the left (as viewed in FIG. 2) against the return spring 45b. Accordingly, the belt-pulley transmission unit 30 provides a transmission ratio suitable for the operating condition of the engine E.

Manually operated shift valve 54 of the hydraulic control circuit 40 is in cooperation with a manual shift lever (not shown) operated by a driver to shift the steplessly variable transmission T into desired drive ranges (which are shown by characters D, 1, 2, R, N and P in FIG. 2). The manually operated shift valve 54 has a spool 54a axially shiftable in cooperation with the action of the manual shift lever and is formed with a pressure inlet port 54b at the middle thereof to which a pressure line 61 is connected to induce line pressure regulated by the regulator valve 42. When the spool 54a of the shift valve 54 is shifted into one of the forward drive ranges (D, 2 and 1), it communicates the pressure line 61 from the hydraulic pump 41 with a clutch control pressure line 62 connected to the hydraulic driven clutch 24 incorporated in the forward/reverse shift unit 20 to lockup the hydraulic driven clutch 24, and thereby the steplessly variable transmission T shifts itself into the forward drive range.

On the other hand, when the spool 54a is shifted to a reverse position (R), it communicates the pressure line 61 from the hydraulic pump 41 with a brake control pressure line 63 connected to the brake 25 incorporated in the forward/reverse shift unit 20 to actuate the brake 25, thereby shifting the steplessly variable transmission T to the reverse range (R). When the forward/reverse changing unit 20 selects the reverse range (R), brake control pressure in the brake control pressure line 63 is induced into the reverse pressure inlet port 45g of the transmission ratio controlling valve 45 through the pressure line 55 and acts on the spool 45a of the transmission ratio control valve 45 to shift it all the way to the right, so as thereby to communicate the control pressure outlet port 45f connected to the first hydraulic cylinder 36 for the primary pulley assembly 33 through the control pressure line with the drain port 45d connected to the drain line 51. This maintains the primary pulley assembly 33 at the minimum effective diameter, so that the steplessly variable transmission T maintains itself at the minimum transmission ratio, and hence at the maximum reduction ratio.

At any one of the park (P) position and neutral or idle (N) positions, the spool 54a shuts off the clutch control pressure line 62, or the pressure inlet port 54b, so as to communicate the clutch control pressure lines 62 and 63 with the drain ports (x) to release the hydraulic driven clutch 24 and the brake 25, thereby shifting the steplessly variable transmission to the park or the neutral range.

An accumulator (ACCM) 64 is disposed between the clutch and brake control pressure lines 62 and 63. The accumulator 64 is for the mitigation of hydraulic pressure applied to or relieved from the clutch 24 and brake 25 so as to prevent the impact of pressure on the clutch 24 and brake 25 upon the operation of the forward/reverse changing unit 20 between the forward and reverse ranges.

Hydraulic control circuit 40 has another regulator valve 65 for further regulating the line pressure regulated by the regulator valve 42 so as to create a lockup clutch control pressure for the lockup clutch 17. The regulator valve 65 has a spool 65a and a return spring 65b urging or forcing the spool 65a in one direction and is formed with a pressure inlet port 65c connected to the regulator valve 42 by way of the pressure line 61 and a regulated pressure outlet port 65d adjacent to the pressure inlet port 65c. The regulator valve 65 is communicated with a lockup clutch control valve 67 by way of a pressure line 66 and an oil tank 80 by way of a drain line 65p.

Lockup clutch control valve 67 has a spool 67a and a return spring 67b urging or forcing the spool 67a in one direction and is formed with a pilot pressure inlet port 67c connected with a pilot pressure line 68 which extends from the reduced pressure line 47 and is provided with a pressure line extension 69 connected to a third duty solenoid 70. Pilot pressure regulated by the third duty solenoid 70 actuated at a certain duty rate acts on one end of the spool 67a and shifts it against the return spring 67b. When the spool 67a of the lockup clutch control valve 67 is shifted to the left as shown in FIG. 2 against the return spring 67b, the pressure line 66 and a lockup pressure line 71 are communicated with each other so as to induce control pressure regulated by the regulator valve 65 into the lockup pressure chamber 18 of the lockup clutch 17, thereby forcing the lockup clutch 17 to lock the torque converter 10. On the other hand, when the spool 67a of the lockup clutch control valve 67 is shifted or returned under the force of the return spring 67b to the right by relieving the pilot pressure, the spool 67a shuts off the lockup pressure line 71 and communicates the pressure line 66 and a release pressure line 72 with each other so as to induce control pressure regulated by the regulator valve 65 into the release or unlock pressure chamber 19 of the lockup clutch 17, thereby forcing the lockup clutch 17 to unlock the torque converter 10, while relieving the control pressure from the lockup pressure chamber 18.

Hydraulic control circuit 40 is further provided with a relief valve 73 connected to the end of the pressure line 47, a lubrication system 77 from which a pressure line extension 76 extends and is connected to the various valves for lubrication, an oil cooler 75 connected to the lockup clutch control valve 67 through a pressure supply line 74a and pressure drain line 74b, and oil filters 78 appropriately located at several points in the pressure lines.

It is to be noted that the duty rate of the duty solenoid 50 is defined by the ratio ($T_{on}/T_{cy}$) of open time $T_{on}$ of the duty solenoid 50 to one cycle of open-to-close time $T_{cy}$.

Referring now to FIG. 3, an electronic control device 80 is shown in block diagram as including a control unit 81, which mainly comprises a microcomputer, for controlling the first, second and third duty solenoids 50, 60 and 70. The control unit 81 is connected to outputs of various sensors, such as a shift position sensor 82 for detecting a shifted position (D, 1, 2, R, N or P) of a shift lever, a throttle opening sensor 83 for detecting the opening of engine throttle valve TVO, a primary pulley speed sensor 84 for detecting the speed of rotation $N_p$ of the primary pulley assembly 33, a secondary pulley speed sensor 85 for detecting the speed of rotation $N_s$ of the secondary pulley assembly 44 (which is referred to as the speed of vehicle), an engine speed sensor 86 for detecting the engine speed $N_e$ of the engine E, a turbine speed sensor 87 for detecting the speed of rotation $N_t$ of the turbine 13 of the torque converter 10 of the steplessly variable transmission 1, and a temperature 88 for detecting the temperature of hydraulic oil $T_o$. These sensors 82 to 88, which are well known in structure and operation and need not be described in detail herein, output appropriate signals $S_a$, $S_b$, $S_c$, $S_d$, $S_e$, $S_f$ and $S_g$, respectively. The control unit 81 controls duty rates for the first to third duty solenoids 50, 60 and 70 according to the output signals from the sensors 82 to 88 to perform the adjustment of pilot pressure to be induced into the regulator valve 42, the transmission speed ratio controlling valve 45 and the lockup clutch control valve 67, respectively, so as to control the line pressure to be supplied to the second hydraulic cylinder 37 of the secondary pulley assembly 34 in order to adjust the tension of the V belt 35 or the ability of transmitting torque of the belt-pulley transmission unit 30, the line pressure to be supplied to first hydraulic cylinder 36 of the primary pulley assembly 33 in order to control the speed ratio of the belt pulley transmission unit 30, and the operation of the lockup clutch 17.

That is, the control circuit 81 is designed to determine the duty rate of the first duty solenoid 50 so as to create a line pressure P given as a function f of turbine torque $T_t$ and transmission ratio $H_h$ as follows:

$$P = f(T_t \times H_h)$$

where
the transmission ratio $H_h$ is defined as a ratio of the speed of rotation $N_s$ of the secondary pulley assembly 34 to the speed of rotation $N_p$ of the primary pulley assembly 33; and
the turbine torque $T_t$ is the product of torque ratio $H_t$ multiplied by the engine output torque $T_e$ of the engine E.

The engine output torque $T_e$ is defined by the speed of rotation $N_e$ and the opening of engine throttle valve TVO. Hence, the line pressure P is defined as the following function F:

$$P = F(T_e \times H_t \times H_h)$$

Figure 5A:
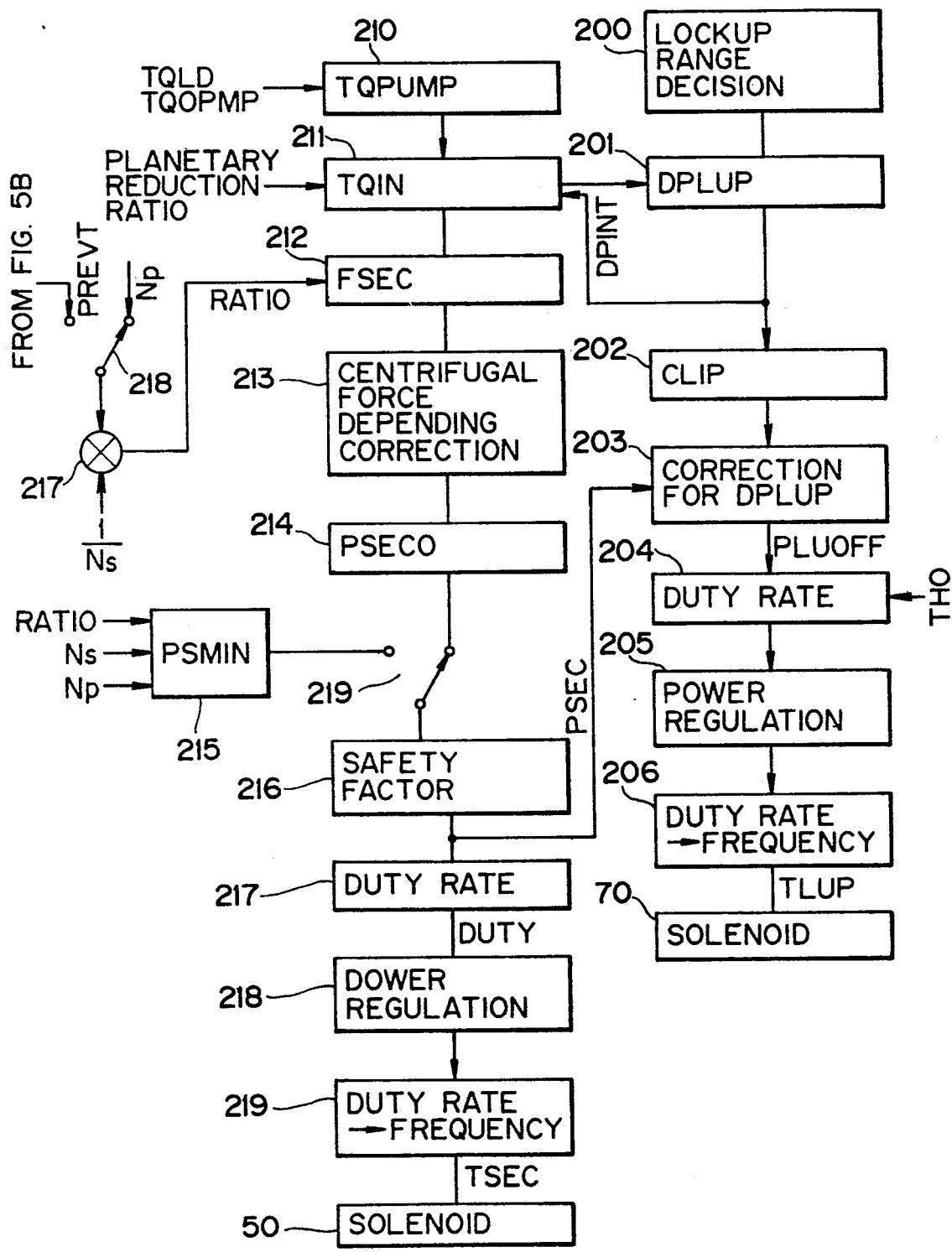
FIGS. 5A and 5B are block diagrams illustrating the operation of the hydraulic control system shown in FIG. 2.
Figure 5B:
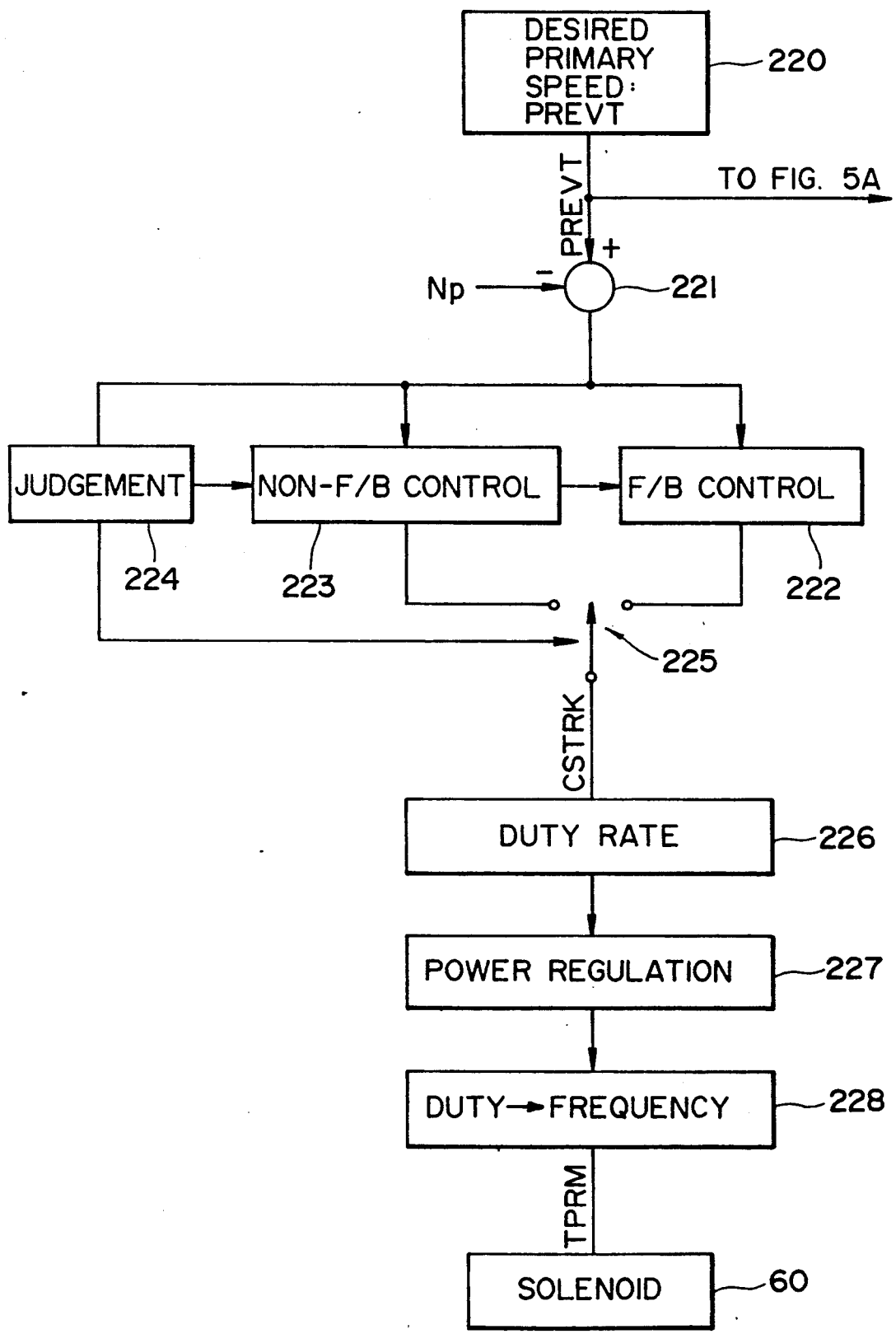
Figure 6A:
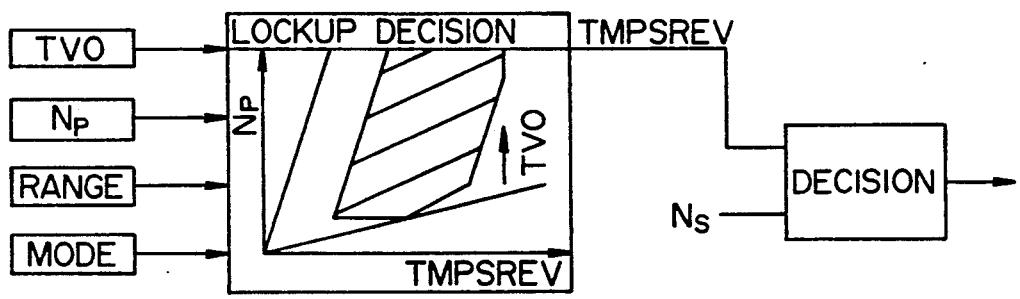
FIG. 6A is a map for determining a range of a lockup control operation.
Figure 6B:
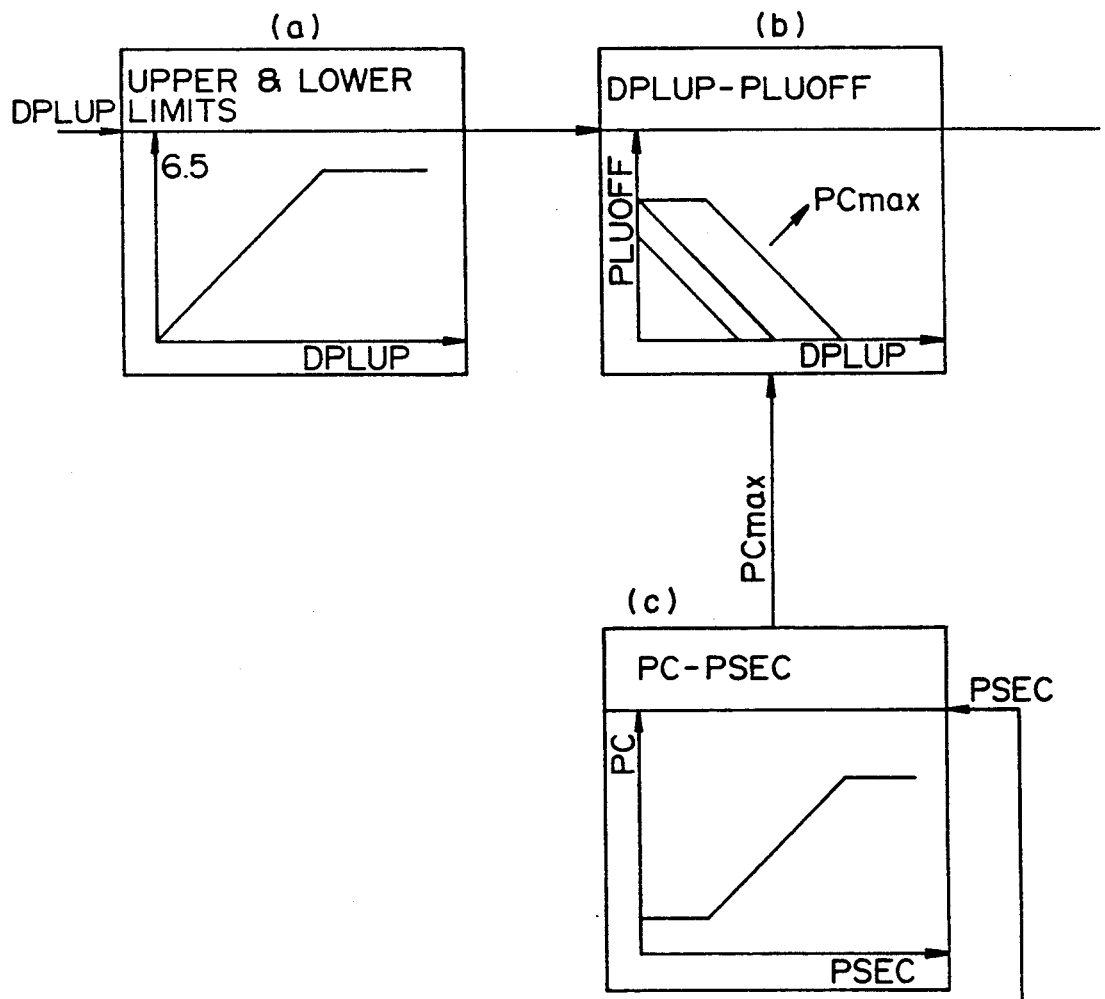
FIG. 6B is an explanatory block diagram showing the operation of calculating a duty for a duty solenoid of a lockup clutch of the steplessly variable transmission.

Referring to FIGS. 5A and 5B illustrating the operation of the control unit 81 in block diagram, the control unit 81 provides the first to third duty solenoids 50, 60 and 70 with duty solenoid control signals TSEC, TPRM and TLUP, respectively, so as to regulate the pilot pressure for the regulator valve 42, the basic line pressure for the secondary cylinder 37 and the pilot pressure for the primary cylinder 36, respectively. To provide the third duty solenoid 70 with the duty solenoid control signal TLUP, the control unit 81 reads the signal $S_a$ from the shift position sensor 82 in block 200 to decide whether or not an on-going operating condition of vehicle is in a lockup range. For making the decision regarding lockup range, a lockup range decision map shown in FIG. 6A is used. When the on-going operating condition is in the lockup range, a target or desired difference of pressure (which is hereinafter referred to as a lockup clutch pressure difference DPLUP) to be developed between the lockup and unlock pressure chambers 18 and 19 of the lockup clutch 17 is computed based on an initial transmissive lockup torque TQIN depending on an effective engine output torque TQPUMP in block 201. The lockup clutch pressure difference DPLUP is corrected between predetermined upper and lower limits by the use of a pressure limiting map (a) shown in FIG. 6B and clipped in block 202 in order to prevent applying an excessive pressure to the lockup clutch 17.

The clipped lockup clutch pressure difference DPLUP is corrected, in block 203, taking into account a line pressure represented by the duty solenoid control signal PSEC which specifies the pressure of oil to be applied to the secondary pressure chamber 37. That is, a larger clutch control pressure PC is drawn as a maximum clutch control pressure $PC_{max}$ from a clutch control pressure map (c) shown in FIG. 6B in accordance with the duty solenoid control signal PSEC representative of the pressure of oil. Then, the lockup clutch pressure difference DPLUP is altered into a desired clutch control pressure PLUOFF by the use of a desired clutch control pressure map (b) shown in FIG. 6B taking the maximum clutch control pressure $PC_{max}$ as an upper limit. The desired clutch control pressure PLUOFF is transformed into a duty rate in block 204. After regulating voltage and, therefore, power in voltage in block 205, the duty rate is transformed into a frequency on which the third duty solenoid 70 is operated. The third duty solenoid 70 is provided with a duty solenoid control signal TLUP so as to operate on the frequency. This duty transforming will be described in detail later.

Figure 7:
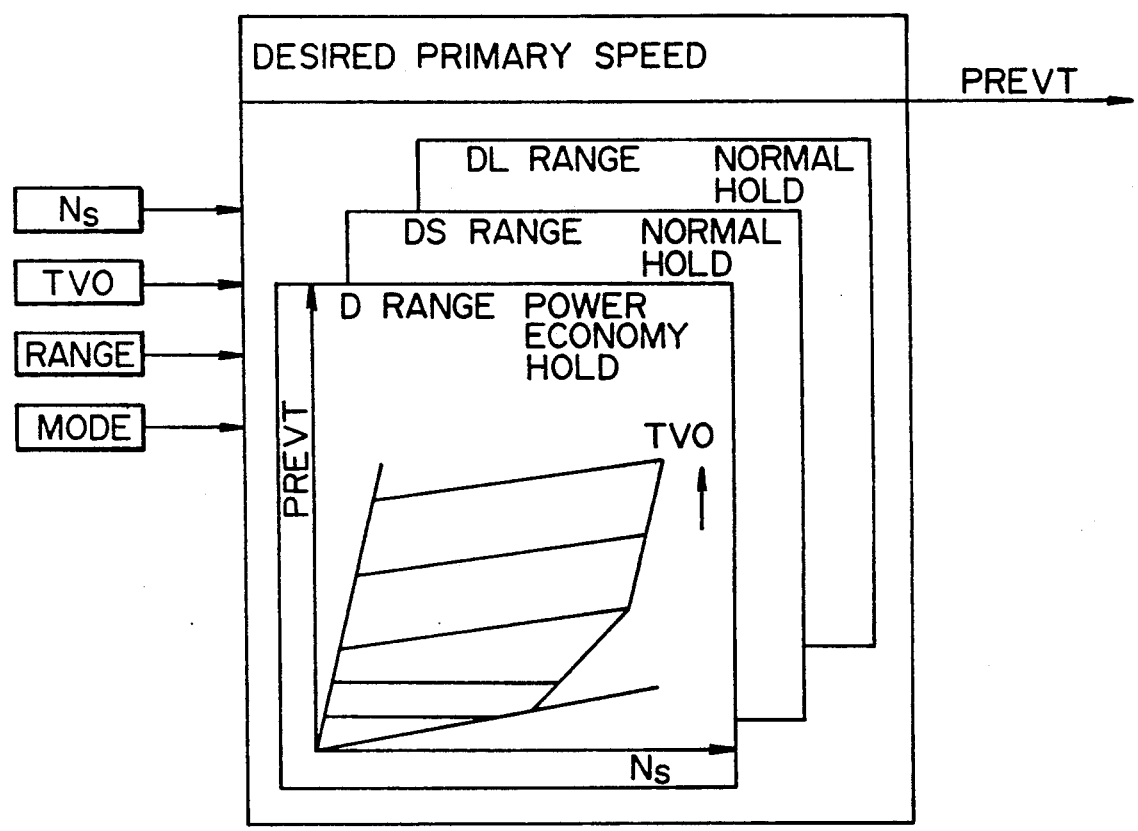
FIG. 7 is an explanatory block diagram showing the calculation of a desired speed of rotation of the primary pulley assembly.

To provide the second duty solenoid 60 with a duty solenoid control signal TPRM, the control unit 81 reads signals Sa (shift position RANGE), Sb (throttle opening TVO), Sd (secondary pulley speed $N_s$) from the shift range sensor 82, throttle opening sensor 83 and secondary pulley speed sensor 84, respectively, and determining, in a conventional manner, an operation mode (MODE) of the system, in order to decide a desired speed of rotation PREVT of the primary pulley assembly 33 from a map shown in FIG. 7 in block 220. The difference in speed of rotation (which is referred to as a speed difference DNP) between the desired speed of rotation PREVT and an operating speed of rotation $N_p$ of the primary pulley assembly 33 is calculated in block 221. The duty solenoid 60 is controlled correcting the speed difference DNP either in feedback control or non-feedback control in block 222 or 223. In block 224, an executive condition of the feedback control is judged. A selector 225 outputs the speed difference DNP as a signal CSTRK, which has been corrected in the feedback control when the executive condition is satisfied or which has been corrected in the non-feedback control when the executive condition is not satisfied, in order to transform it into a duty rate in block 226. Thereafter, the duty solenoid control signal TPRM is provided for the duty solenoid 60 in the same manner as for the duty solenoid control signal TLUP with which the duty solenoid 70 is provided.

Figure 8A:
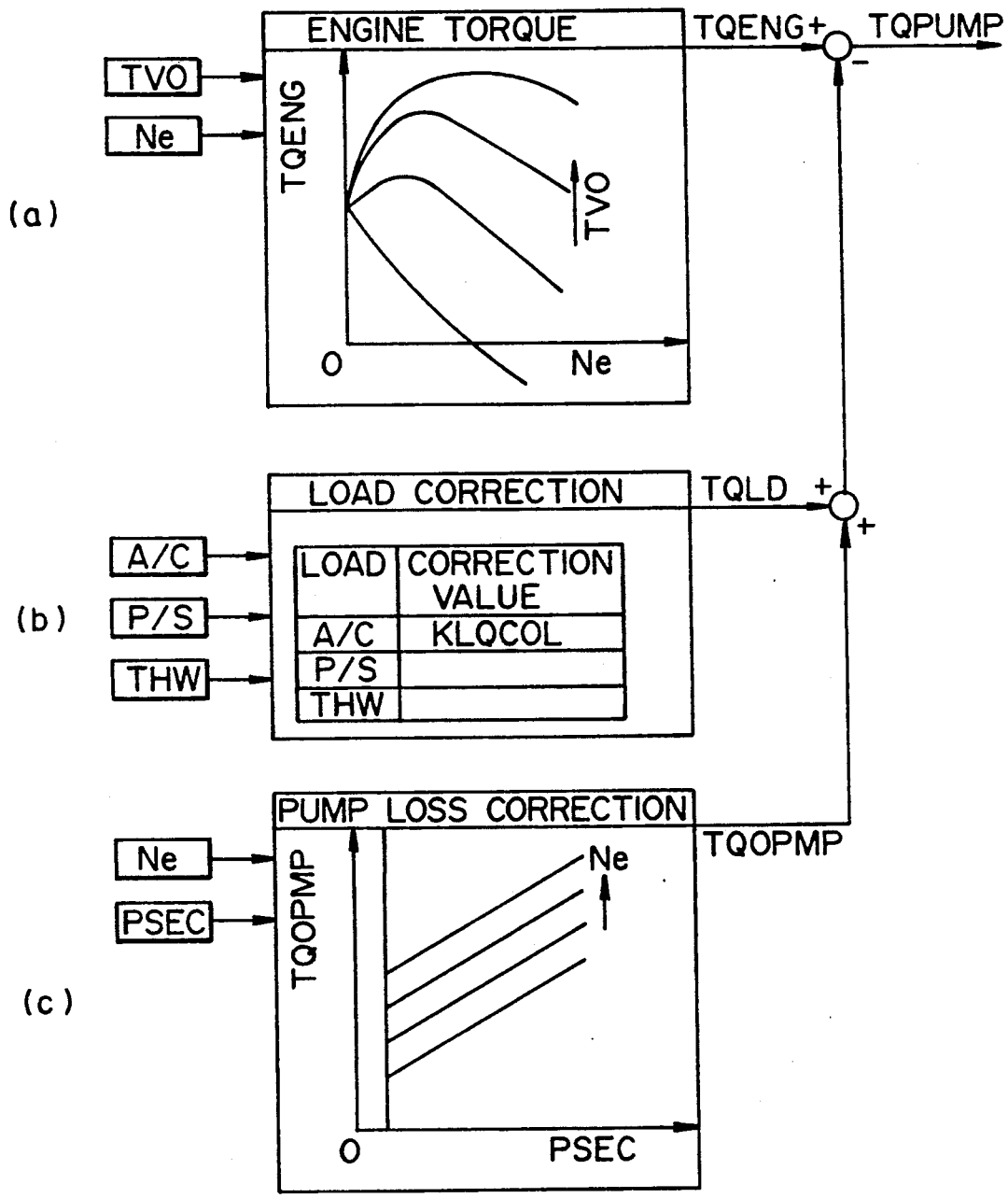
FIG. 8A is an explanatory block diagram showing the calculation of an engine output torque.

Referring back to FIG. 5A, the first duty solenoid 50 is provided with the duty solenoid control signal TSEC, the control circuit 81 calculates an effective engine output torque TQPUMP in block 210. The calculation of effective engine output torque TQPUMP is performed by subtracting an engine-load-depending correction value TQLD and an oil-pump-loss-depending correction value TQOPMP from a nominal engine torque TQENG which is drawn in block (a) shown in FIG. 8A depending upon the engine speed of rotation Ne and throttle opening TVO as signals Se and Sb provided from the engine speed sensor 86 and the throttle opening sensors 83, respectively. Taken into account as factors for engine load are an air conditioning system (A/C), a power steering system (P/S) and the temperature (THW) of the engine E as specified in a table (b) shown in FIG. 8A. The pump-loss-depending correction value TQOPMP is drawn from a map (c) shown in FIG. 8A depending upon the line pressure PSEC applied to the secondary pulley assembly 34 and the engine speed of rotation Ne provided as a signal Se from the secondary speed sensor 85 and the engine speed sensor 86, respectively.

Input torque TQIN to the primary pulley assembly 33 (which will be referred to as a primary pulley input torque) from the forward/reverse shift unit 20 is calculated depending upon the effective engine torque TQPUMP in block 211. As will be described in detail later, the primary pulley input torque TQIN is precisely decided by calculating a resultant torque from a torque TQLUP transmitted from the engine E through the lockup clutch 17 and a torque TQCVD transmitted from the engine E through the torque converter 10. Based on the primary pulley input torque TQIN and a desired transmission ratio RATIO, an axial force or thrust FSEC necessary to press the movable flange 34b against the stationary flange 34a of the secondary pulley assembly 34 is calculated in block 212 in a manner described later. The axial force FSEC, after having been corrected according to centrifugal force developed in the secondary pulley assembly 34 in block 213, is transformed into a thrust pressure PSECO in block 214.

A minimum pressure PSMIN, which is necessary to cause the steplessly variable transmission T to operate at a desired transmission ratio RATIO and the desired speed of rotation $N_p$ of the primary pulley assembly 33 of the belt-pulley transmission unit 30, is calculated in block 215. A selector 219 selects a larger one between the line thrust pressures PSECO and minimum pressure PSMIN, which is used to provide a duty solenoid control signal TSEC for the duty solenoid 50. It will be described in detail later in association with FIGS. 8C and 9A-9D how a centrifugal force develops and why a larger pressure is selected before providing a duty solenoid control signal TSEC.

Figure 8B:
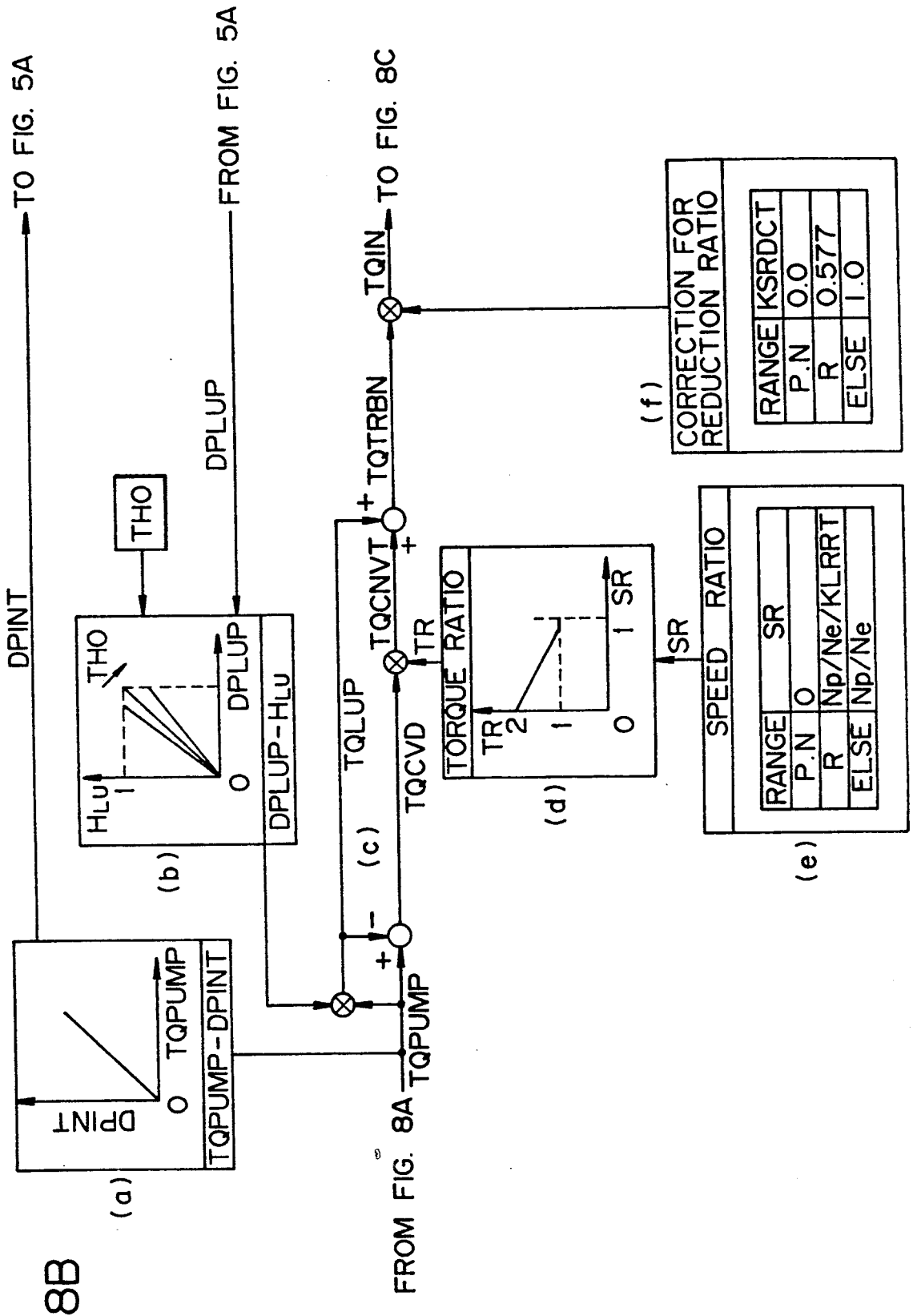
FIG. 8B is an explanatory block diagram showing the calculation of a turbine output torque.

The calculation of primary pulley input torque TQIN executed in block 211 is described hereafter in more detail with reference to FIG. 8B. As was previously noted, the steplessly variable transmission T is controlled by regulating line pressure taking into account both the torques which are transmitted through the turbine 13 of the torque converter 10 and the lockup clutch 17, respectively, when engine output is transmitted to the primary pulley assembly 33 of the belt-pulley transmission unit 30 through the torque converter 10 and the lockup clutch 17 incorporated in the torque converter 10. That is, the engine torque TQENG of the engine E is divided into two and separately transmitted to the torque converter 10 and the lockup clutch 17. Because of this, these two torques are transmitted to the input shaft 31 of the primary pulley assembly 33 at different torque transmission ratios. Accordingly, it is essential to grasp how the engine torque TQENG is divided into two in order to have an accurate input torque to the input shaft 31 of the primary pulley assembly 33.

To calculate these torques thus divided, in this embodiment, a clutch transmissive torque TQLUP, which should refer to and mean a torque transmitted to the lockup clutch 17 from the engine E, is calculated first and then, a converter input torque TQCVD, which should refer to and mean a torque transmitted to the torque converter 10 from the engine E, is calculated by subtracting the clutch transmissive torque TQLUP from the effective engine output torque TQPUMP. Otherwise, the converter input torque TQCVD and the clutch input torque TQLUP may be computed in the reverse order.

An initial pressure difference DPINT between the lockup pressure chamber 18 and unlock pressure chamber 19 is drawn from an initial pressure difference map or TQPUMP-DPINT map (a), shown in FIG. 8B in accordance with the effective engine output torque TQPUMP. It is noted that such an initial pressure difference map is established depending on individual lockup clutch units. As was previously described, the initial pressure difference DPINT, which is exerted on the lockup clutch 17, is transformed into a lockup clutch pressure difference DPLUP taking into account conditions necessary to make the decision of a lockup range (see FIG. 6A) in block 201 shown in FIG. 5A. Because a torque actually exerted on the lockup clutch 17 practically depends on the temperature or viscosity of oil in the unlock pressure chamber 19 of the torque converter 10, a lockup clutch transmissive ratio $H_{LU}$, which is between zero (0) and one (1), is drawn from a lockup transmission ratio map or DPLUP-$H_{LU}$ map (b) shown in FIG. 8B in accordance with the temperature of oil THO. For a given lockup clutch transmission ratio $H_{LU}$, the lower a lockup pressure difference exerted on the lockup clutch 17 is, the higher the temperature of oil THO will be The clutch input torque TQLUP exerted on the lockup clutch 17 is practically given as a product of the lockup clutch transmissive ratio $H_{LU}$ and effective engine output torque TQPUMP from the following equation:

$$TQLUP = TQPUM \times H_{LU}$$

Accordingly, the converter input torque TQCVD is calculated from the following equation:

$$TQCVD = TQPUMP - TQLUP$$

An output torque from the torque converter 10, referred to as a converter transmissive torque TQCNVT, is calculated taking into account a torque ratio TR drawn from a torque ratio map (d), shown in FIG. 8B, according to a transmission ratio from the following equation:

$$TQCNVT = TQCVD \times TR = (TQPUMP - TQLUP) \times TR$$

Hence, a resultant torque TQTRBN composed from the clutch input torque TQLUP through the lockup clutch 17 and the converter input torque TQCVD through the torque converter 10 is given by calculating the following equation:

$$TQTRBN = TQLUP + TQCNVT$$

The resultant torque TQTRBN is input to the forward-/reverse shift unit 20 and transmitted to the primary pulley assembly 33. Because the forward/reverse shift unit 20 takes the form of a planetary gearset, a primary pulley input torque TQIN is altered according to a reduction ratio KSRDCT of the planetary gearset of the forward/reverse shift unit 20 as follows:

$$TQIN = TQTRBN \times KSRDCT$$

Reduction ratio KSRDCT is predetermined according to shift ranges as shown in a reduction ratio table (f) in FIG. 8B.

Torque ratio TR, which is defined as the ratio of converter input torque relative to the total input torque transmissive to the primary pulley assembly 33, is determined depending upon a shift range and a speed ratio SR defined as a ratio of the speed of rotation $N_p$ of the primary pulley assembly 33 relative to the speed of rotation $N_e$ of the engine E as given in a speed ratio table (e) shown in FIG. 8B. Letting $SR_r$ and KLRRT be a speed ratio which is defined as a ratio of the speed of rotation $N_p$ of the primary pulley assembly 33 relative to the speed of rotation $N_e$ of the engine E when the steplessly variable transmission T is in the reverse range (R) and a reduction constant of the forward/reverse shift unit 20 in the reverse range, respectively, the speed ratio $SR_r$ is given by $N_p/N_e$/KLRRT. When the forward/reverse shift unit 20 selects the park (P) or Neutral (N) range, the speed ratio SR is zero (0). Torque ratio TR is drawn from the torque ratio map or SRTR map (d). In the SR-TR map (d), the torque ratio TR takes a maximum value of two (2) for a speed ratio SR of zero (0), and decreasingly changes as the speed ratio SR becomes larger and takes a minimum value of one (1) for speed ratios SR larger than 0.8. In the above-described manner, the primary pulley input torque TQIN is precisely calculated in block 211 of FIG. 5A.

On the other hand, a line pressure PSEC applied to the secondary pulley assembly 34, which is referred to as a secondary pulley input torque, is computed through blocks 212 to 216 of FIG. 5A. The axial force or thrust FSEC necessary to press the movable flange 34b against the stationary flange 34a of the secondary pulley assembly 34 is defined as a pressure applied to the lockup clutch 17 so as to keep desired effective diameters of the primary and secondary pulley assemblies 33 and 34 against a tension of the endless V-belt 35. Because effective diameters of the primary and secondary pulley assemblies 33 and 34 are complementarily changed according to transmission ratios RATIO, the thrust FSEC must be changed depending upon transmission ratios RATIO.

Figure 8C:
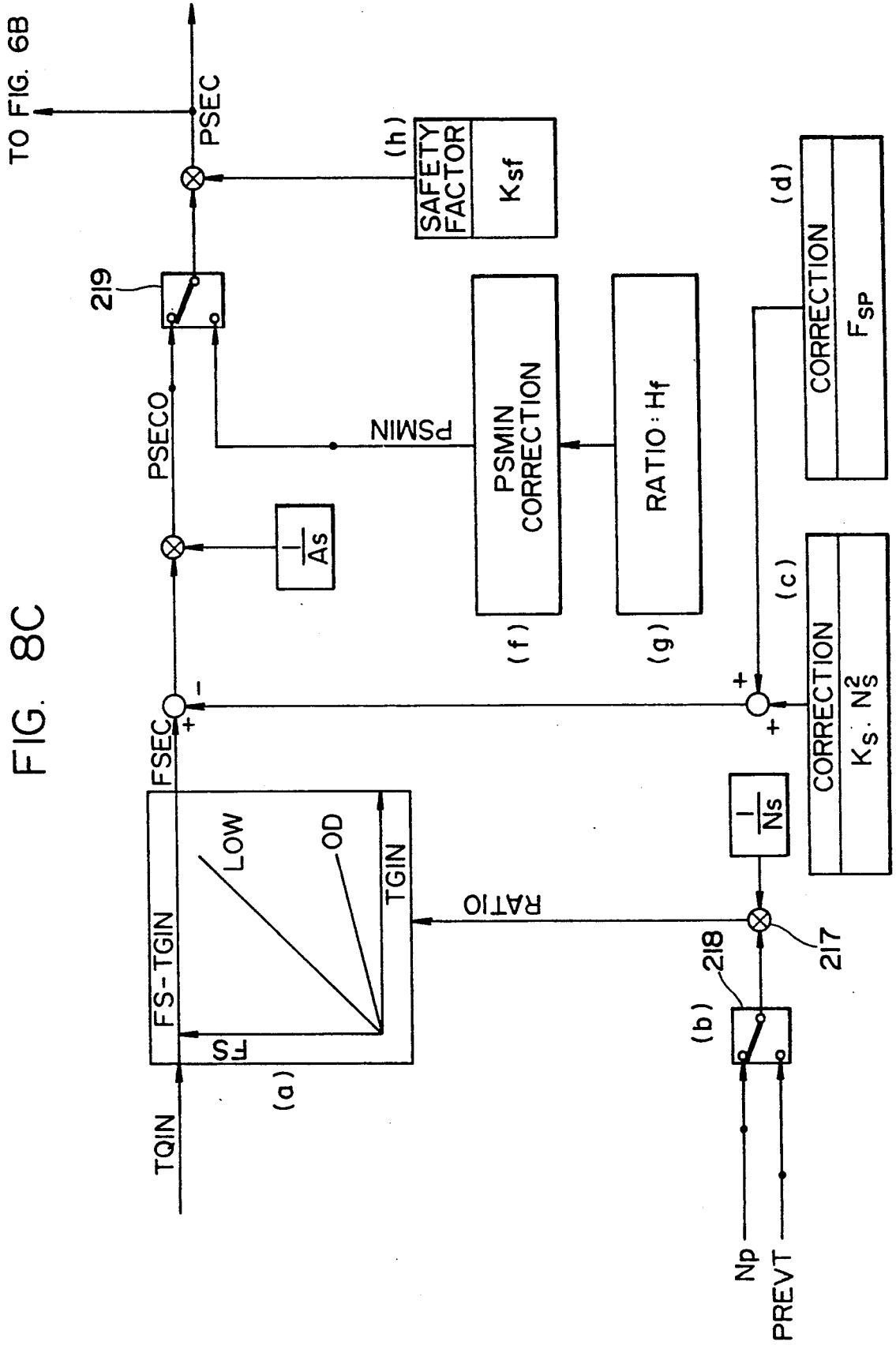
FIG. 8C is an explanatory block diagram showing corrections depending upon centrifugal force of a pulley assembly, the temperature of oil and a spring force.

Transmission ratio RATIO is calculated as shown in FIG. 8C. That is, the present or actual speed of rotation $N_p$ and target or desired speed of rotation PREVT of the primary pulley assembly 33 are compared to each other to decide which one is higher than the other. This is because, it is essential to produce a thrust FSEC to be exerted on the secondary hydraulic cylinder 36 which is equal to a larger one of a thrust necessary to keep the present transmission ratio and a thrust required after changing a transmission ratio. If the present speed of rotation $N_p$ is determined to be larger than the desired speed of rotation PREVT and is selected by means of a selector 218, transmission ratio RATIO is given as follows:

$$RATIO = N_p/N_s$$

According to this transmission ratio RATIO and primary pulley input torque TQIN, a proper thrust FSEC is drawn from a thrust map (a) shown in FIG. 8C. Obviously, the larger the transmission ratio is, the greater the thrust necessary on the secondary hydraulic cylinder 36 is.

Figure 9A:
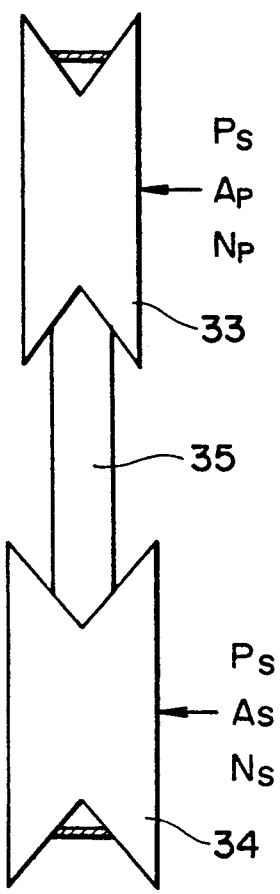
FIGS. 9A to 9D are views for explaining improper behavior caused when the centrifugal-force-depending correction is made for the line pressure.
Figure 9D:
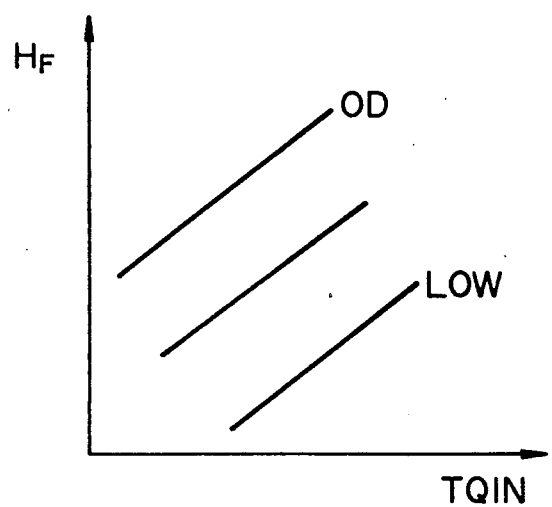

For easy understanding of the necessity of controlling the pressure of oil in the hydraulic control circuit 40 according to centrifugal forces caused in the pulley assemblies, reference is made to FIGS. 9A to 9D. As shown in FIG. 9A, letting $A_p$ and $A_s$ be effective cross-sectional areas of rotating primary and secondary pulleys, respectively, thrusts $F_p$ and $F_s$ on the primary and secondary pulleys are expressed by the following equation in which a line pressure $P_s$ loaded commonly on these pulleys is taken into account:

$$F_p = A_p \times P_s + K_p \times N_p^2 \qquad (I)$$

$$F_s = A_s \times P_s + K_s \times N_s^2 + F_{sp} \qquad (II)$$

where
 $K_p$ and $K_s$ are constants;
 $K_p \times N_p^2$ or $K_3 \times N_s^2$ is a thrust depending on a centrifugal force; and
 $F_{sp}$ is a force of the spring.
To effect an accurate change of transmission ratio, the ratio between the thrusts represented by the following equation must be maintained at a certain value:

$$H = F_p/F_s \qquad (III)$$

If the ratio, $H_f$, is not maintained at a certain value, an undesirable situation may arise in which, for example, the effective diameter of the primary pulley assembly 33 does not change although the effective diameter of the secondary pulley does change.

Figure 9B:
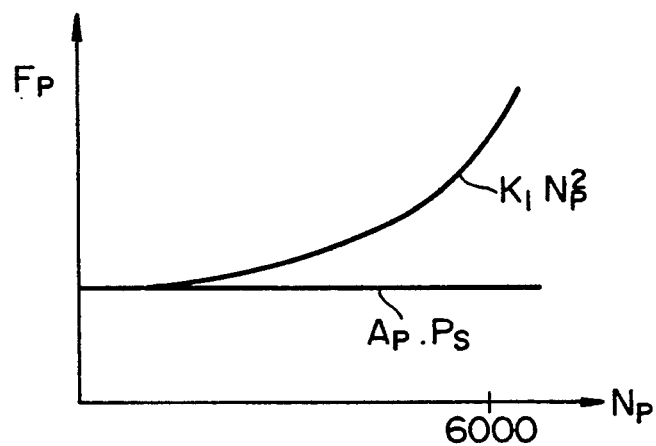
Figure 9C:
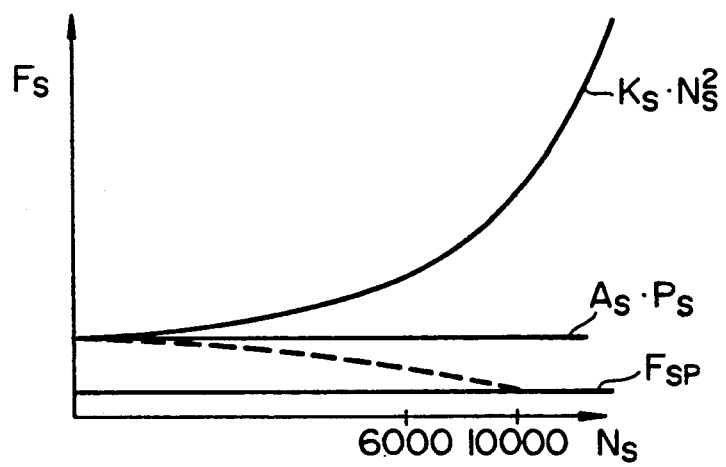

As will be understood from FIG. 9B and 9C showing graphs of thrusts $F_p$ and $F_s$ on the primary and secondary pulley assemblies 33 and 34 relative to speeds of rotation $N_p$ and $N_s$ of the primary and secondary pulley assemblies, respectively, the thrust $F_p$, $F_s$ depending upon centrifugal force increasingly changes proportionally to the square of speed of rotation $N_p$, or $N_s$, of the pulley assembly. Because the centrifugal force acts on the pulley so as to press the flanges of the pulley assembly against each other, decreasing the line pressure by the thrust force due to the centrifugal force, causes a decrease of load of the oil pump 41, so as to contribute to fuel economy. A broken line in FIG. 9C shows changes of the pressure, $A_s \times P_s$, caused when the line pressure $P_s$ is correctively lowered by a pressure caused due to the centrifugal force. As was previously noted, because the ratio $(A_p:A_s)$ in area between the primary and secondary pulley assemblies 33 and 34 is substantially 2:1, even though the thrust $F_s$ on the secondary pulley assembly 34 is maintained constant when the line pressure is lowered by a pressure caused due to the centrifugal force, a decrease in the thrust force, $A_p \times P_s$, on the primary pulley becomes large, resulting in that the ratio $H_f$ becomes hard to be properly maintained. This is because, although the centrifugal force is proportional to the square of speed of the rotation of the pulley assembly, the absolute value of the centrifugal force itself is small. Accordingly, if a decrease of the line pressure due to centrifugal force become large, there is a tendency for the line pressure to become considerably less than a minimum pressure absolutely required. This tendency is enhanced as the speed of rotation $N_s$ of the secondary pulley assembly 34, which depends upon the speed of vehicle, becomes high. For example, if the line pressure $P_s$ is lowered by a pressure $\Delta P$ due to a centrifugal-force-depending correction, a change of the thrust force $F_p$ is $A_p \times \Delta P$. As a result, the thrust $F_p$ on the primary pulley assembly 33 is considerably lowered. For this reason, a measure is taken, in this embodiment, to correct a lower limit of line pressure when the line pressure $P_s$ becomes lower than a minimum pressure. A lower limit pressure PSMIN is given by solving the equation (III) for $P_s$ as follows:

$$PSMIN = [(K_s \times N_s^2 + F_{sp}) \times H_f - K_p \times N_p^2]/[(A_p - A_s \times H_f)] \qquad (IV)$$

Referring back to FIG. 8C, the necessary axial force or thrust FSEC is corrected first according to centrifugal force $(K_s \times N_s^2)$ and spring force $(F_{sp})$. The thrust pressure PSECO on the piston 37a of the secondary hydraulic cylinder 37 having a cross-sectional area $A_s$ is calculated from the following equation:

$$PSECO = [FSEC - (K_s \times N_s^2 + F_{sp}]/A_s$$

A selector 219 selects a smaller one between the lower limit pressure PSMIN and thrust pressure PSECO. For the purpose of an ensured operation, a line pressure PSEC is calculated by multiplying the selected pressure, namely the lower limit pressure PSMIN or thrust pressure PSECO, by a safety factor $K_{sf}$ in block (h) of FIG. 8C. In this manner, the line pressure PSEC suitable for ensuring the changing of speed at any speed of rotation $N_s$ of the secondary pulley 34 is obtained.

Figure 10:
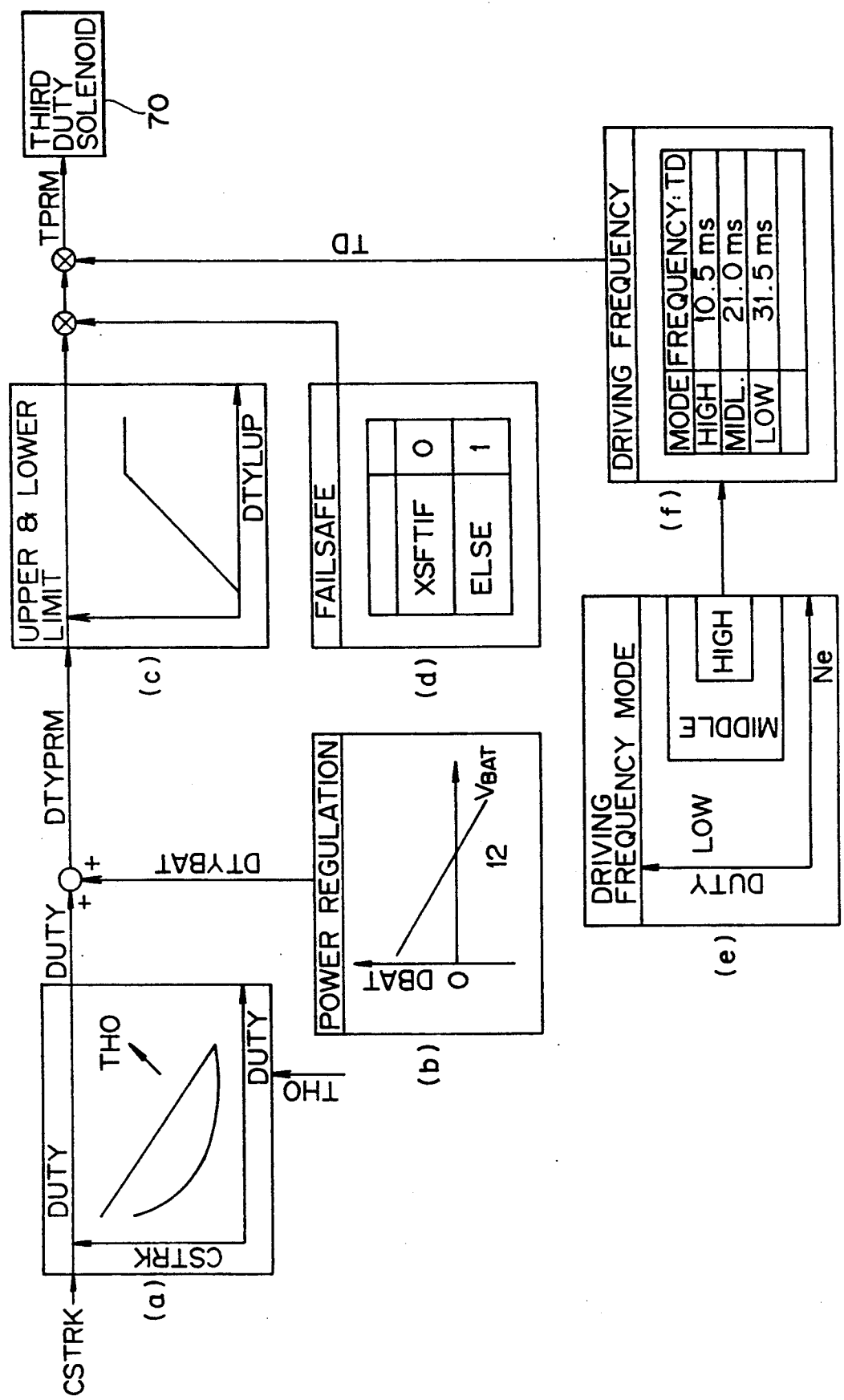
FIG. 10 is an explanatory block diagram showing the controlling of the frequency at which the duty solenoid is driven.

Referring to FIG. 10, conceptually shows a control system for controlling frequencies on which the duty solenoids 50, 60 and 70 are driven or actuated, respectively, depending upon the amount of oil spouting from the hydraulic pump 41, or the speed of rotation $N_e$ of the engine E, and duty rates for the purpose of not only decreasing pulsations of oil pressure but also increasing the durability of the duty solenoids. Because all the duty solenoids 50, 60 and 70 are controlled in the same manner, the following description will be given regarding the duty solenoid 60 only.

Signal CSTRK output from the selector 225 is transformed into a duty rate DUTY according to a duty transformation map or CSTRK-DUTY map (a) of FIG. 10. As apparent from the CSTRK-DUTY map (a), the higher the temperature of oil THO becomes, the higher the duty rate DUTY is set. After regulating the voltage of a power battery according to the duty rate DUTY, the duty rate DUTY is clipped according to an upper & lower clipping map (c) of FIG. 10. Then, a fail-safe processing is taken in a well known manner in block (d) of FIG. 10. In block (d), the sign "XSFTIF" refers to and means a flag representing the state of fail.

On the other hand, a zone of frequencies on which the duty solenoid 60 is driven is selected depending upon the duty rate DUTY drawn from the CSTRK-DUTY map (a) of FIG. 10 and the speed of rotation $N_e$ of the engine E from a driving frequency mode map (e)

of FIG. 10. In this embodiment, three zones, namely a low driving frequency zone LOW, middle driving frequency zone MIDDLE and high driving frequency zone HIGH, are provided to set a driving frequency TD to 10.5 msecs. when the duty rate DUTY and speed of rotation $N_e$ of the engine fall in the low driving frequency zone LOW, 21.0 msecs. when the duty rate DUTY and speed of rotation $N_e$ of the engine fall in the middle driving frequency zone MIDDLE or 31.5 msecs. when the duty rate DUTY and speed of rotation $N_e$ of the engine fall in the high driving frequency zone HIGH as shown in table (f) of FIG. 10. The reason for controlling frequency for the duty solenoid is that harmful effects of pulsation are caused in the oil spouting from a hydraulic pump if the duty rate of the duty solenoid is variable at a constant driving frequency. The driving frequency is established higher as the amount of oil spouting from the hydraulic pump 41 or the speed of rotation of the engine becomes higher. This is because, since, as the amount of oil spouting from the hydraulic pump increases, a pressure of the oil is apt to have a large amplitude of pulsation, and the lowering of the driving frequency of the duty solenoid results in ripples which are small even if caused.

The control unit 81 can comprise either a digital type microcomputer or an analog type microcomputer to perform the controlling of line pressure and duty rates of the duty solenoid in the hydraulic control system for the steplessly variable transmission with a lockup torque converter. The operation of the hydraulic control system depicted in FIG. 2 is best understood by reviewing FIG. 11, which is a flow chart illustrating a routine for the microcomputer of the control unit 81. Since programming a computer is a skill well understood in the art. The following description is written to enable a programmer having ordinary skill in the art to prepare an appropriate program for the microcomputer of the control unit 81. The particular details of any such program would of course depend upon the architecture of the particular computer selected.

Figure 11:
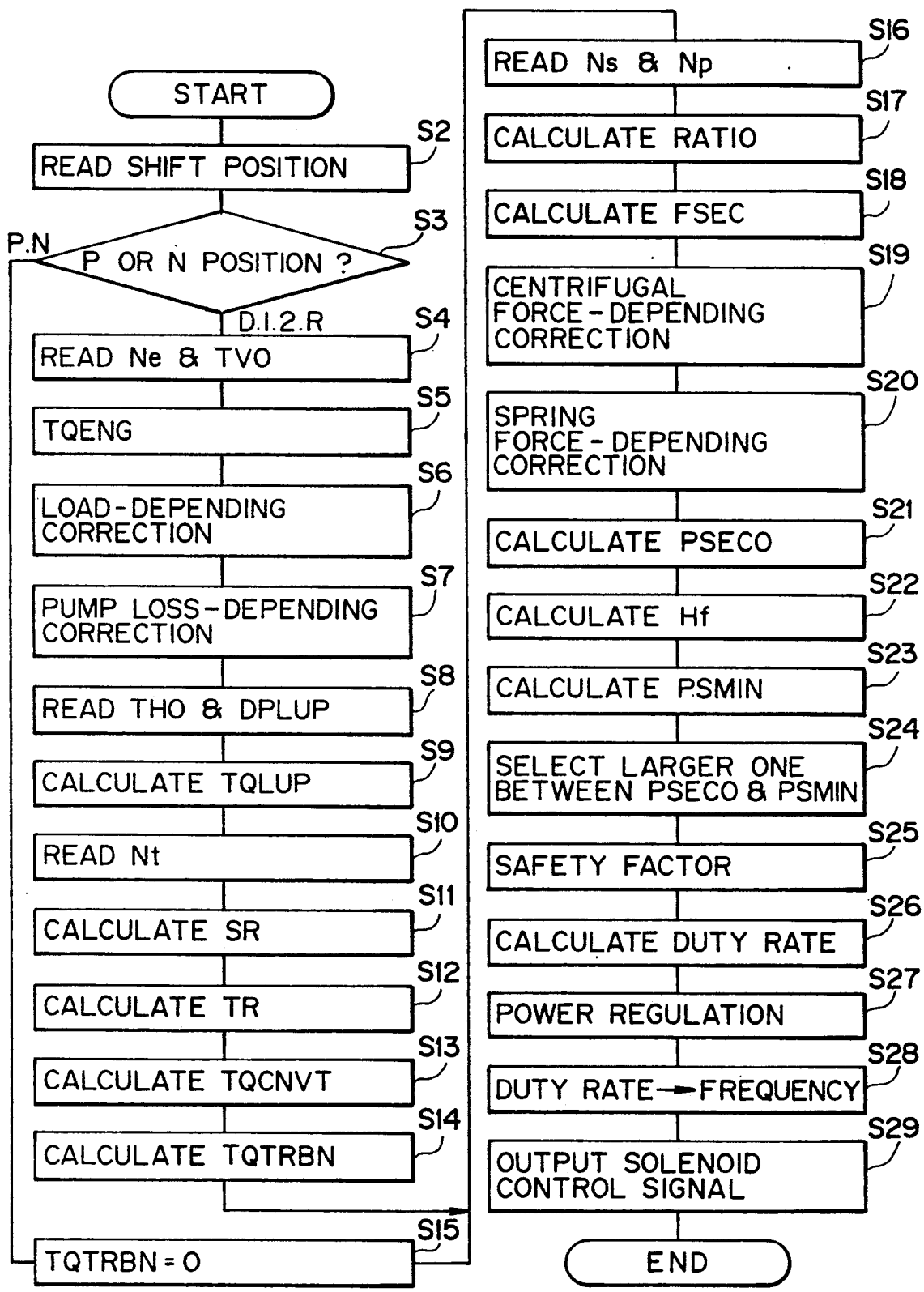
FIG. 11 is a flow chart illustrating a duty solenoid control routine for the control unit comprising a digital microcomputer.

Referring now to FIG. 11 illustrating the routine for the microcomputer of the control unit 81, the first step is to read a shift position signal RANG from the shift position sensor 82 in step S2 after powering on the microcomputer of the control unit 81. The shift position signal RANG is judged in step S3 to decide whether or not the steplessly variable transmission is in the park (P) or neutral (N) position where no action is caused. If the answer to the decision is no, indicating the steplessly variable transmission is in any one of the drive (D), first (1), second (2) and reverse (R) positions, the microcomputer of the control unit 81 reads signals of the engine speed $N_e$ and throttle opening TVO from the engine speed sensor 86 and throttle opening sensor 83, respectively, in step S4. In step S5, an engine torque TQENG is calculated based on the engine speed $N_e$ and throttle opening TVO read in step S4. After correcting the engine torque TQENG depending upon an engine load in step S6 and a pump loss in step S7, an engine output torque TQPUMP is calculated.

The temperature of oil THO is read from the temperature sensor 88 in step S8 to calculate an initial difference of pressure DPINT of the lockup clutch 17 according to the engine output torque TQPUMP. As was previously described, a pressure difference DPLUP is calculated according to the initial difference of pressure DPINT of the lockup clutch 17 to control a duty of the duty solenoid for the primary pulley assembly. Based on the pressure difference DPLUP thus calculated, a lockup clutch transmission ratio $H_{LU}$ is calculated. Thereafter, a lockup clutch transmissive torque TQLUP is calculated from the following equation according to the pressure difference DPLUP and lockup clutch transmission ratio $H_{LU}$ in step S9:

$$TQLUP = DPLUP \times H_{LU}$$

A signal $S_f$ is read from the turbine speed sensor 87 to decide the speed of rotation $N_t$ of the turbine 13 of the torque converter 10 of the steplessly variable transmission T in step S10 and a speed ratio SR is calculated from the following equation in step S11:

$$SR = N_t/N_e$$

It is noted that the speed of rotation $N_t$ of the turbine 13 of the torque converter 10 is equivalent to the speed of rotation $N_p$ or $N_p \times KLRRT$ in table (e) of FIG. 8B. After calculating a torque ratio TR in step S12 in the manner as was previously described as to tables (d) and (e) of FIG. 8B, a converter transmissive torque TQCNVT is calculated from the following equation in step S13:

$$TQCNVT = (TGPUM - PTQLU) \times TR$$

Then, a composite torque TQTRBN is calculated from the following equation according to the clutch input torque TQLUP through the lockup clutch 17 and the converter input torque TQCVD through the torque converter 10 in step 14:

$$TQTRBN = TQLUP + TQCNVT$$

A primary pulley input torque TQIN is obtained by making a correction for the compositive torque TQTRBN according to a reduction ratio KSRDCT of the planetary gearset of the forward/reverse shift unit 20.

The microcomputer of the control unit 81 reads signals $S_c$ and $S_d$ representing the speeds of rotation $N_p$ and $N_s$ of the primary and secondary pulley assemblies 33 and 34 from the primary and secondary pulley speed sensors 84 and 85, respectively, in step S16 to calculate a transmission ratio RATIO in step S17. In step 18, an axial force or thrust FSEC necessary to press the movable flange 34b against the stationary flange 34a of the secondary pulley assembly 34 is calculated in the manner as was previously described as to block (a) of FIG. 8C. Corrections are made for the thrust FSEC according to centrifugal force ($K_s \times N_s^2$) and spring force ($F_{sp}$) in steps S19 and S20, respectively, to obtain a desired line pressure PSECO to be applied to the piston of the secondary pulley assembly 34 in step S21.

The following steps are taken to calculate a minimum line pressure PMIN according to the latest transmission ratio. This is because, the correction according to centrifugal force has a chance of making the desired line pressure PSECO lower than the minimum line pressure. That is, after calculating the ratio $H_f$ from the equation (III) in step S 22, then, a minimum line pressure PSMIN required to vary speed is calculated from the equation (IV) in step S23. Step S24 is taken to select either one of the desired line pressure PSECO and minimum line pressure PSMIN which is higher than the other. After making a correction for the selected one with a safety factor $K_{sf}$ in step 25, the line pressure PSEC is altered into a duty rate DUTY in step S26. After making a power-depending correction in step S27, the duty rate DUTY is transformed into a frequency in step S28. Finally, a control signal is applied to control the duty solenoid 50 to operate it on the frequency in step S29.

Referring back to step S3, if the answer to the decision is yes, indicating that the steplessly variable transmission is in the park (P) or neutral (N) position where no action is caused, then, after setting a turbine torque TQTRBN to zero (0) in step S15, steps S16 through S29 are taken.

Whereas the present invention has been described in detail with respect to a preferred embodiment, nevertheless, various variants are possible. For example, in place of obtaining the converter transmissive torque TQCNVT, which is necessary for calculating the turbine torque TQTRBN, based on the remainder of the engine output torque TQPUMP from the clutch input torque TQLUP, it may be possible to obtain the converter transmissive torque TQVNVT, which is necessary for calculating the turbine torque TQTRBN, based on the remainder of the engine output torque TQPUMP from the clutch input torque TQLUP. It may also be possible to obtain the converter transmissive torque TQCNVT first and then the remainder of the engine output torque TQPUMP from the converter transmissive torque TQCNVT, taking into account a clutch transmission ratio $H_{LU}$.

It is possible to detect, if needed, the turbine torque TQTRBN itself, which is calculated to obtain a necessary line pressure. This is because, the turbine torque TQTRBN accurately reflects the output of the torque converter.

Furthermore, in place of calculating the clutch input torque TQLUP based on an initial difference of pressure DPINT drawn from the TQPUMP-DPINT map, the difference between pressures on both sides of the lockup clutch 17 can be directly detected by means of a pressure sensor to calculate the clutch input torque TQLUP.

Although, in the above embodiment, a frequency at which a duty solenoid is controllably driven is determined taking into account both the duty rate and the amount of oil spouting from the hydraulic pump, the same result can be obtained even when a frequency at which a duty solenoid is controllably driven is determined taking into account either one of the duty rate and the amount of oil spouting from the hydraulic pump.

The present invention, in which duty solenoids are driven at controlled frequencies, respectively, can be embodied not only in the steplessly variable transmission shown and described above but also in various types of hydraulically controlled transmissions.

Furthermore, the present invention, in which the line pressure is regulated or controlled after having divided a torque into two portions, of which is transmitted through a lockup clutch, the other being transmitted through a converter, can also be embodied not only in the steplessly variable transmission shown and described above but also in various types of hydraulically controlled transmissions.

It is to be understood that although the invention has been described in detail with respect to a preferred embodiment, nevertheless, various other embodiments and variations are possible which are within the spirit and scope of the invention, and such are intended to be covered by the following claims.

What is claimed is:

1. A control system for a hydraulically controlled steplessly variable transmission having primary and secondary pulley assemblies operationally coupled to each other by means of a belt and variable in effective diameter to steplessly vary a transmission ratio of the hydraulically controlled steplessly variable transmission comprising:
    a hydraulic pump for developing a basic line pressure in the control system according to an engine output transmitted to the primary pulley from an engine;
    a regulator valve for regulating said basic line pressure;
    a duty solenoid for regulating a pilot pressure for said regulator valve so that said regulator valve regulates the basic line pressure; and
    a control unit for calculating a minimum line pressure according to the centrifugal force of the primary and secondary pulley assemblies and a ratio of thrusts exerted on the primary and secondary pulley assemblies, and a desired line pressure necessary to cause the hydraulically controlled steplessly variable transmission to operate at a desired transmission ratio thereof according to a thrust, acting on one of the primary and secondary pulley assemblies and decreased according to a centrifugal force of the one of the primary and secondary pulley assemblies, selecting the higher of the minimum line pressure and the desired line pressure, and operating said duty solenoid so that said regulator valve produces the selected pressure as said basic line pressure.

2. A control system as defined in claim 1, wherein said one of the pulley assemblies is the secondary pulley assembly.

3. A control system as defined in claim 2, wherein said basic line pressure is determined based on an engine torque transmitted to the primary pulley assembly and a transmission ratio of the hydraulically controlled steplessly variable transmission.

4. A control system as defined in claim 3, wherein said engine torque is an output torque which is determined based on an opening of a throttle of the engine and a speed of rotation of the engine.

5. A control system as defined in claim 4, wherein said output torque is corrected according to a load on the engine.

6. A control system as defined in claim 4, wherein said output torque is corrected according to an output loss of said hydraulic pump.

7. A control system as defined in claim 4, wherein said output torque is corrected according to a temperature of engine coolant.

8. A control system as defined in claim 3, wherein said minimum line pressure is a pressure, acting on the secondary pulley assembly, necessary to keep a predetermined ratio of thrust between the primary and secondary pulley assemblies.

9. A control system as defined in claim 3, wherein said hydraulically controlled steplessly variable transmission is equipped with a lockup torque converter and said engine torque is a compositive torque of a torque transmitted to the primary pulley assembly through a lockup clutch of the torque converter and a torque transmitted to the primary pulley assembly through the torque converter.

* * * * *